United States Patent [19]
Mizuochi et al.

[11] Patent Number: 5,367,587
[45] Date of Patent: Nov. 22, 1994

[54] OPTICAL AMPLIFIER

[75] Inventors: Takashi Mizuochi; Tadayoshi Kitayama; Katsuhiro Shimizu; Kiwami Matsushita; Nobuyuki Takemura; Eiichi Nakagawa, all of Kamakura, Japan

[73] Assignee: Mitsubishi Denki Kabushiki Kaisha, Tokyo, Japan

[21] Appl. No.: 193,721

[22] Filed: Feb. 9, 1994

Related U.S. Application Data

[63] Continuation of Ser. No. 971,512, Nov. 3, 1992, abandoned.

[30] Foreign Application Priority Data

Nov. 8, 1991 [JP] Japan ................... 3-292865
Feb. 19, 1992 [JP] Japan ................... 4-031846
Apr. 7, 1992 [JP] Japan ................... 4-085518
Jun. 22, 1992 [JP] Japan ................... 4-162786

[51] Int. Cl.$^5$ ........................... G02B 6/26; H01S 3/00
[52] U.S. Cl. ................................. 385/27; 372/6; 385/122; 359/341
[58] Field of Search ................... 372/6, 27, 69, 71; 385/27, 11, 122; 359/341

[56] References Cited

U.S. PATENT DOCUMENTS

| 4,554,510 | 11/1985 | Shaw et al. ............... | 372/6 |
| 5,015,054 | 5/1991 | Chaffee ..................... | 372/6 |
| 5,058,974 | 10/1991 | Mollenauer ............... | 385/27 |
| 5,115,338 | 5/1992 | DiGiovanni et al. ..... | 359/337 |
| 5,187,759 | 2/1993 | DiGiovanni et al. ..... | 385/27 |
| 5,216,728 | 6/1993 | Charlton et al. .......... | 385/27 |

FOREIGN PATENT DOCUMENTS

| 0392490A1 | 10/1990 | European Pat. Off. ..... H04B 10/16 |
| 0404152 | 11/1990 | European Pat. Off. . |
| 0415438A2 | 3/1991 | European Pat. Off. ..... H04B 10/16 |
| 0444694 | 9/1991 | European Pat. Off. . |
| 0449475A3 | 10/1991 | European Pat. Off. ..... H04B 10/16 |
| 2550645 | 8/1983 | France ...................... G11B 7/13 |
| 4005867 | 8/1991 | Germany . |
| 3215982 | 9/1991 | Japan . |
| 2242091A | 9/1991 | United Kingdom ......... H04B 10/08 |

OTHER PUBLICATIONS

Shinji Matsuoka, et al. "Supervisory Signal Transmission Methods for Optical Amplifier Repeater Syhstems", 1990, IEEE.

Primary Examiner—Frank Gonzalez
Attorney, Agent, or Firm—Wolf, Greenfield & Sacks

[57] ABSTRACT

An optical-fiber light amplifier using rare-earth-doped optical fibers. The light amplifier combines first and second excitation light from first and second sources to form combined excitation light and divides the combined excitation light for inverted distribution to both two optical fibers. The light entered one optical fiber and that entered the other optical fiber are polarized so as to be perpendicular to each other so that fluctuation of output level is prevented without mutual interference. Alternatively the first excitation light and the second excitation light may have different wavelengths; also in this case, fluctuation of level is prevented without any interference.

26 Claims, 32 Drawing Sheets

OPTICAL AMPLIFIER

This application is a continuation of application Ser. No. 07/971,512, filed Nov. 3, 1992 and now abandoned.

BACKGROUND OF THE INVENTION

1. Field of the Invention

This invention relates to an optical-fiber light amplifier which is to be used in a light communication system and uses an optical fiber doped of a rare earth element.

2. Description of the Related Art

FIG. 1 of the accompanying drawings shows a conventional optical-fiber light amplifier of the type described above, the amplifier being to be used for a two-system signal line. In FIG. 1, reference numerals 1a, 1b designate first and second rare-earth-doped optical fibers; 2a, 2b, first and second excitation light sources; 3a, 3b, first and second multiwavelength combining and dividing devices; 4a, 4b, first and second excitation light source drive circuits; 5a, 5b, 5c, 5d, input and output terminals for signal light; and 11a, 11b, first and second isolators.

In operation, each of the first and second rare-earth-doped optical fibers 1a, 1b is a single-mode optical fiber doped of a rare earth element such as erbium (Er) and having a length of several meters to several tens meters. The first multiwavelength combining and dividing device 3a is connected to the first rare-earth-doped optical fiber 1a. The multiwavelength combining and dividing devices may be optical couplers. The first and second excitation light source 2a, 2b are semiconductor lasers having a wavelength of, for example, 1.48 µm and are driven the first and second excitation light source drive circuits 4a, 4b, respectively. When several mW to several tens mW of first excitation light outputted from the first excitation light source 2a is inputted to the first rare-earth-doped optical fiber 1a via the first multiwavelength combining and dividing device 3a, the first rare-earth-doped optical fiber 1a assumes an inverted distribution state so that the signal light having a wavelength of 1.53 or 1.55 µm and inputted from the input and output terminal 5a for the signal light is amplified by the action of induced emission for output to the input and output terminal 5b. Likewise, when the second excitation light outputted from the second excitation light source 2b is inputted to the second rare-earth-doped optical fiber 1b via the second multiwavelength combining and dividing device 3b, the second rare-earth-doped optical fiber 1b assumes an inverted distribution state so that the signal light inputted from the input and output terminal 5c amplified for output to the input and output terminal 5d. With this conventional arrangement, it is impossible to improve the reliability of this type optical-fiber light amplifier.

The simplest popular optical-fiber light amplifier for a single-system signal has a construction such as shown in FIG. 2. This known art is exemplified by Japanese Patent Laid-Open Publication No. Hei 2-241073. In this light amplifier, two sources for excitation light are combined by a combining device. In FIG. 2, reference numeral 1 designates a rare-earth-doped optical fiber; 2a, 2b, first and second excitation light sources; 3, a multiwavelength combining device for combining excitation light and signal light; and 8, a combining device for combining the first excitation light and the second excitation light. However, when the first excitation light and the second excitation light are combined by the combining device 8, the combined light power will be ½ of the total light power of the first and second excitation light emitted from the first and second sources 2a, 2b. Further, since the first excitation light and the second excitation light interfere with one another, the output power of the combining device tends to fluctuate and hence to be non-stable.

FIG. 3 shows a conventional optical amplifier for a double-system signal, which is a natural expansion of the construction of FIG. 2. First excitation light and second excitation light outputted from the first and second sources 2a, 2b are combined and then divided by a combining and dividing device 8, and the resulting separate parts of excitation light are inputted to first and second rare-earth-doped optical fibers 1a, 1b via first and second multiwavelength combining devices 3a, 3b. However, the output of the combining device 8 is non-stable so that the amplifying characteristic of the rare-earth-doped optical fibers 1a, 1b will not be stable.

With this conventional arrangement, the level of excitation light to be inputted to the amplifying media will not be stable.

FIG. 4 shows another conventional light amplifier, which is disclosed in "The Impact That An Er-doped Optical-Fiber Amplifier Contributes To Light Communication" by T. Shimada, Oplus, No. 113, pp. 75–82, 1989. In FIG. 4, reference numeral 1 designates a rare-earth-doped optical fiber; 2, an excitation light source; 3, a combining and dividing device; 4, an excitation light source drive circuit; and 5, an optical fiber serving as a signal transmission path.

In operation, the rare-earth-doped optical fiber 1 is a single-mode optical fiber doped of a rare earth element such as erbium (Er) and having a length of several meters to several tens meters. The combining and dividing device 3a is connected to the rare-earth-doped optical fiber 1. The combining and dividing device may be an optical coupler. The excitation light source 2 is a semiconductor laser having a wavelength of, for example, 1.48 µm and is driven the excitation light source drive circuit 4. When several mW to several tens mW of excitation light outputted from the excitation light source 2 is inputted to the rare-earth-doped optical fiber 1 via the combining and dividing device 3, the rare-earth-doped optical fiber 1 assumes an inverted distribution state so that the signal light having a wavelength of 1.53 or 1.55 µm and inputted from the optical fiber 5 is amplified by the action of induced emission. The rare-earth-doped optical fiber 1, the excitation light source 2, the combining and dividing device 3 and the excitation light source drive circuit 4 jointly constitute a light amplifying means.

In the light amplifier utilizing the action of induced emission, natural emission light is emitted along with the action of light amplification. This natural emission light produces noise, which deteriorates the signal-to-noise rate of signal light. The noise resulting from natural emission light is exemplified by shot noise due to natural emission light, beat noise between signal light and natural emission light, and beat noise between one natural emission light and another natural emission light. Natural emission light is free of polarization dependency and has the component parallel to the polarization plane of signal light and that perpendicular thereto.

Further, when two or more light amplifiers are to be used as connected in tandem, accumulation of natural emission light brings down the saturation level of signal gain of the light amplifier.

With the conventional light amplifier, the noise resulting from natural emission light would deteriorate the signal-to-noise ratio of signal light. If two or more of the conventional light amplifiers are used as connected in tandem, accumulation of natural emission light would bring down the saturation level of signal gain of the individual light amplifier.

FIG. 5 shows a convention light amplification repeating system, which is disclosed in Japanese Patent Laid-Open Publication No. Hei 3-214936.

In this conventional light amplification repeating system, when the main signal light c, on which a subcarrier a is superposed, is inputted from a main signal light input terminal 1, the main signal light c is branched by a light branching coupler 14. Part of the branched main signal light c is inputted to a subcarrier processing circuit 20 where a process takes place based on the subcarrier a. A subcarrier generator 15 generates a subcarrier b based on the subcarrier a, and an excitation light source drive circuit 18 drives an excitation light source 19, and a rare-earth-doped optical fiber 12 modulates, in intensity, main signal light c, whereupon main signal light d, on which the subcarrier b is superposed, is transmitted to the repeating system at the subsequent stage. At that time the subcarrier b to be superposed has a frequency different from the subcarrier a.

With this arrangement, the subcarrier to be processed by the subcarrier processing circuit must have a different frequency for every light repeating system.

FIG. 6 shows a typical light amplification repeating system equipped with light amplifiers and utilizing light excitation. The technology of this kind is disclosed in detail in, for example, Japanese Patent Laid-Open Publication No. Hei 3-214936. In FIG. 6, reference numerals 100a, 100b designate light end offices; 101c, 101d, 101e, light amplification repeaters; 102b, 104a light-to-electric converters; 103a, 103b, subcarrier terminals; 102a, 104b, electric-to-light converters; 105c, 105d, 105e, 107c, 107d, 107e, light amplifiers; and 106c, 106d, 106e, subcarrier transmitters.

In the conventional supervisory method, assuming that an abnormality, such as a fiber breakage between the light amplifiers 105c, 105d or a fault of the light amplifier occurs, the subcarrier transmitter 106c generates a subcarrier to modulate the light amplifier 105d, which is an excitation LD, and transmits the subcarrier to the downstream side. The subcarrier terminal 103b discriminates the context of the transmitted subcarrier and issues an appropriate command.

FIG. 7 shows the conventional light amplifier and subcarrier transmitter which are shown in Japanese Patent Laid-Open Publication No. Hei 3-214936. In FIG. 7, reference numeral 105 designates a light amplifier; 106, a subcarrier transmitter; 111, an erbium-doped fiber; 112a, 112b, light isolators; 113, a light branching device; 114, a light combining device; 115, an excitation LD; 116, a subcarrier processing circuit; 117, a subcarrier generator; and 118, an excitation LD drive circuit. FIGS. 8A, 8B and 8C show the signal and spectrums of the system of FIG. 7.

In operation, the signal light is inputted to the light branching device 113 via the isolator 112a. The light branching device 113 branches a small quantity of the power to the subcarrier processing circuit 116 and most of the remaining power to the erbium-doped fiber 111. In the subcarrier processing circuit 116, the state of light input to the light amplifier is detected. In the subcarrier generator 117, a subcarrier is generated based on information from the subcarrier processing circuit 116 and the state of operation of the light amplifier. The information from the subcarrier processing circuit is a breakage of input to the light amplifier when, for example, the upstream fiber happened to be cut off. What to be supervised while the light amplifier is operative may be a fault of the excitation LD. The excitation LD drive circuit drives the excitation LD by a current obtained by superposing the subcarrier on a bias current. The excitation light is modulated in intensity by the subcarrier.

FIG. 8A schematically shows the output light from the excitation LD 115 to the light combining device 114 in FIG. 7; a signal slightly modulated by 1 to several % is superposed on a direct current.

Since the gain of the light amplifier is very dependent on the excitation light power, it will be modulated as the excitation light is modulated in intensity. Consequently the envelope of signal light is modulated in intensity by the subcarrier.

The transmission characteristic of the light amplification repeating and transmission system is a band pass characteristic; it has therefore been customary to premodulate the subcarrier by a sine wave having predetermined binary information. This concept is discussed in detail in, for example, Japanese Patent Laid-Open Publication No. Hei 3-252231 and "Control of Supervision in Light Amplification Repeating and Tranmission Method" by Imai et al., Electronic Information Communication Society Spring Meeting B-944, 1992.

Transmission of a subcarrier requires a high transmission quality. On many occasions the quality of signal is evaluated on the carrier/noise ratio (C/N ratio). The present inventors discovered that the main factor to deteriorate the C/N ratio of a subcarrier is the intensity noise produced from the light amplifier. The intensity noise is expressed quantitatively by relative intensity noise (RIN).

FIG. 8B shows a frequency spectrum of electric power density of the output light from the excitation LD 115 in FIG. 7. As shown in FIG. 8B, in the conventional excitation in which a direct current is modulated by a subcarrier, noise would occur chiefly at the low-frequency side so that the output of the light amplifier 112b of FIG. 7 will be as indicated by the frequency spectrum of FIG. 8C. Consequently the frequency of the subcarrier deteriorates the C/N ratio.

FIG. 9 shows the result of calculation of the C/N ratio when the modulation degrees of the subcarrier is varied. When RIN is $-\$$, the C/N ratio is determined by the natural emission light of the light amplifier; thus 90 dB is obtained with a modulation degree of 1%. However, the C/N ratio varies markably, compared to RIN. In fact, the measurement of RIN of the output light from the light amplifier shows that RIN at 5 kHz was $-82$ dB/Hz. Calculating the C/N ratio using this value, the C/N ratio at a modulation degree of, for example, 1%, was only 20 dB. Consequently an adequate code error cannot be achieved.

The mode of supervising operation for any breakage of communication channel in the foregoing circuit will now be discussed.

Assuming that the fiber between the light amplifiers 105c, 105d is cut off, "input is cut off" will be judged, based on the fact that the light power branched from the branching device 113 in the subcarrier transmitter 106d of the light amplification repeater 101d is lowered from a threshold preset in the subcarrier processing circuit 116. Instantly the subcarrier generator 117 generates a subcarrier, which will modulate the excitation LD of the light amplifier 105d and will then be transmitted to the downstream side.

Also in the light amplification repeater 101e at the next stage, the light power will be lowered to start generating a subcarrier, but the light power outputted from the upstream light amplifier 105d is increased progressively (the time constant at this time depends on the relaxation time of natural emission from the light amplifier) so that the subcarrier processing circuit in the light amplification repeater 101e at the next stage will stop transmission of the carrier signal soon.

With this light amplification repeater, the C/N ratio of a supervisory signal would be lowered to deteriorate the quality of the supervisory signal.

When detecting any breakage of signal channel, the subcarrier terminal 103b will receive a subcarrier, indicating the fact "input is cut off", not only from the light amplification repeater 101c but also the light amplification repeater 101d. Consequently it was impossible to discriminate as to which information is correct.

SUMMARY OF THE INVENTION

It is therefore a first object of this invention to provide a high-reliability optical-fiber light amplifier which does not cause fluctuation of light power level of an output signal even when output light level fluctuation of excitation light sources or cutting-off of one of the excitation light sources occurs.

A second object of the invention is to provide an optical-fiber light amplifier which can retard deterioration of the signal-to-noise ratio, causing only a limited extent of lowering of saturation level due to the cascade connection.

A third object of the invention is to provide a light repeating system which can demodulate and sample a first subcarrier from level fluctuation of main signal light, on which the first subcarrier was superposed from the front stage, when received the main signal light and which can superpose a second subcarrier of an arbitrary frequency (including the same frequency as the first subcarrier) on main signal light or natural emission light for transmission.

A fourth object of the invention is to improve the C/N ratio of a subcarrier at the output stage of a light amplification repeater.

A fifth object of the invention is to make it possible to detect one of light amplification repeaters at which a signal-line breakage has occurred.

According to a first aspect of the invention, there is provided an optical-fiber light amplifier comprising: first and second sources for emitting first excitation light and second excitation light, respectively; means for polarizing the first excitation light and the second excitation light in such a state that they are perpendicular to each other; means for combining the first excitation light and second excitation light, which are emitted from the polarizing means, to form combined light; means for distributing the combined light from the combining means to both first and second output terminals; and first and second amplifying media connected to the first and second output terminals, respectively. The first and second amplifying media are optical fibers doped of, for example, a rare earth element.

Since the first excitation light and the second excitation light from the first and second excitation light sources are combined after controlled in such a polarized state that they are perpendicular to one another, the combined light is free from fluctuation due to interference. Further, since the combined light is divided for distribution to the first and second implying media, both the first and second amplifying media can perform the amplifying action even when the cutting-off of either of the first and second excitation light sources has occurred.

According to a second aspect of the invention, there is provided an optical-fiber light amplifier comprising: a first source for emitting first excitation light; a second source for emitting second excitation light having a wavelength different from those of the first excitation light; means for combining the first excitation light and the second excitation light to form combined light; means for distributing the combined light to both first and second output terminals; and first and second amplifying media connected to the first and second output terminals, respectively. The first and second amplifying media may be optical fibers doped of, for example, a rare earth element.

Since the first excitation light and the second excitation light are different in wavelength from one another, it is possible to prevent the first excitation light and the second excitation light from interfering with one another when combined, thus keeping the combined light free from fluctuation.

According to a third aspect of the invention, there is provided an optical-fiber light amplifier comprising: first and second sources for emitting first excitation light and second excitation light, respectively; means for combining the first excitation light and the second excitation light to form combined light; means for distributing the combined light to both first and second output terminals; and an amplifying medium connected to both the first and second output terminals for inputting the first excitation light and the second excitation light. The amplifying medium may be an optical fiber doped of, for example, a rare earth element.

Since the first excitation light and the second excitation light are inputted to the amplifying medium from the opposite terminals (i.e., first and second input terminals) after combined, the amplifying medium can perform the amplifying action even when the cutting-off of either of the first and second excitation light sources has occurred. At that time, a symmetrical inverted distribution takes place about the center of the amplifying medium to cause a uniform amplifying characteristic, regardless of the direction of inputting the light signal.

According to a fourth aspect of the invention, there is provided an optical-fiber light amplifier comprising: light-amplifying means for amplifying a light signal; and polarization-limiting means connected in series to the light-amplifying means for eliminating natural emission light from the light-amplifying means. The light-amplifying means may include an optical fiber doped of, for example, a rare earth element.

The optical-fiber light amplifier may further comprise: means for dividing part of the output light from the polarization-limiting means; light-detecting means connected to one output terminal of the dividing means; and means for controlling the polarization-limiting means based on the output of the light-detecting means.

In this optical-fiber amplifier, the polarization regulating means eliminates or reduces the natural emission light whose polarization plane is perpendicular to that of the light signal emitted from the light amplifying means to retard deterioration of the signal-to-noise ratio due to the noise of the natural emission light. Further, partly since the output light divided by the dividing means is detected and partly since the polarization plane of the polarization controlling means is controlled based on the detected output light power, it is possible to control the output light power freely.

According to a fifth aspect of the invention, there is provided an optical-fiber light amplifier comprising: error-signal-generating means for inputting a light signal, on which a first subcarrier is superposed, and generating an error signal according to the difference between the level of the light signal and a predetermined reference level; constant level means for maintaining the level of the light signal at a constant level, based on the error signal outputted from the error-signal-generating means; subcarrier-processing means for detecting and processing the first subcarrier based on the error signal; and subcarrier-superposing means for generating a second subcarrier based on the process of the subcarrier processing means and for superposing the second subcarrier on the light signal maintained at the constant level by the constant level means.

The constant level means eliminates the intensity modulation due to the first subcarrier and samples the first subcarrier from the error-signal-generating means. Since the subcarrier-superposing means superposes the second subcarrier on the main signal light, which has become to have a constant level, it is possible to superpose the second subcarrier, whose arbitrary frequency (of course, may be equal to the first subcarrier) is regardless of the frequency of the first subcarrier of the main signal light, on the main signal for transmission.

According to a sixth aspect of the invention, there is provided a light amplification repeating system with a monitoring function using a light amplifier, the system comprising: error-signal-generating means for inputting a light signal, on which a first subcarrier is superposed, and for generating an error signal according to the difference between the level of the light signal and a predetermined reference level; subcarrier-processing means for detecting and processing the first subcarrier based on the error signal; and subcarrier-superposing means for generating a second subcarrier based on the process of the subcarrier-processing means and for superposing the second subcarrier on natural emission light from the light amplifier.

Since the natural emission light from the light amplifier is utilized as the subcarrier for a supervisory signal, it is possible to transmit the subcarrier to the subsequent stage even when the main signal light is not inputted such as due to a circuit breakage.

According to a seventh aspect of the invention, there is provided a light repeating system comprising: subcarrier-transmitting means for inputting part of a light signal on which a first sub-carrier is superposed and for generating a second sub-carrier from the first sub-carrier; excitation-light-source-driving means for outputting a driving signal based on the second sub-carrier outputted from the subcarrier-transmitting means; means for modulating the driving signal, which is outputted from the excitation-light-source-driving-means, with a signal whose frequency is higher than that of the second subcarrier; an excitation light source to be driven by a modified driving signal outputted from the modulating means; and amplifying means for superposing the second subcarrier on the light signal, on which the first subcarrier is superposed, by excitation light from the excitation light source.

Since the excitation light source is driven by the signal modulated by a frequency adequately higher than the subcarrier, it is possible to reduce the noise due to mode hopping.

According to an eighth aspect of the invention, there is provided a light repeating system with a monitoring function, comprising: subcarrier-transmitting means for inputting part of a light signal on which a first sub-carrier is superposed and for generating a second sub-carrier from the first sub-carrier; excitation-light-source-driving means for outputting a driving signal based on the second sub-carrier outputted from the subcarrier-transmitting means; a self-oscillation excitation light source to be driven by the driving signal outputted from the excitation-light-source-driving means; and amplifying means for superposing the second subcarrier on the light signal, on which the first subcarrier is superposed, by excitation light from the self-oscillation excitation light source.

Since the excitation light having a frequency adequately higher than the subcarrier is outputted from the self-oscillating excitation light source, it is possible to reduce the noise due to mode hopping.

According to a ninth aspect of the invention, there is provided a light repeating system composed of a plurality of light repeaters, each with a monitoring function, and a light end office, the system comprising: demodulating means located in the light end office for demodulating subcarriers transmitted from the individual light repeaters; and judging means located in the light end office for judging it abnormal when abnormal information contained in the subcarrier demodulated by the demodulating means continues for a predetermined time period or appears a predetermined number of occasions.

BRIEF DESCRIPTION OF THE DRAWINGS

FIG. 18 is a diagram showing an optical-fiber light amplifier according to a ninth embodiment of the invention;

FIG. 38 is a block diagram showing a light end office according to a fourteenth embodiment of the invention;

DETAILED DESCRIPTION

Figure 10:
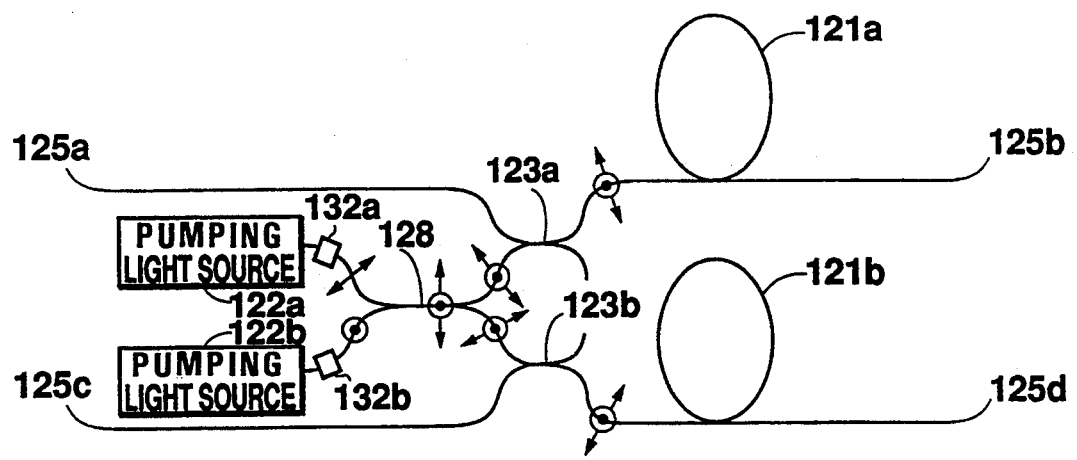
FIG. 10 is a diagram showing an optical-fiber amplifier according to a first embodiment of this invention.

FIG. 10 shows a first embodiment of an optical-fiber amplifier according to a first aspect of this invention. In FIG. 10, reference numerals 121a, 121b designate first and second optical fibers doped of a rare earth element; 122a, 122b, first and second excitation light sources; 123a, 123b, first and second multiwavelength combining devices for combining signal light and excitation light; 128, an excitation light combining and dividing device; and 132a, 132b, first and second polarization controllers. The multiwavelength combining device may be a multiwavelength optical coupler, and the excitation light combining and dividing device may be an optical coupler. The polarization controller may be a construction in which the native polarization plane of a polarization-maintaining fiber can be fixed to match the polarization of excitation light and is fixed to an optional axis of the combining device, or another construction in which a k/4 plate and a k/2 plate are incorporated, or a further construction in which a desired polarization state can be obtained using a Faraday rotating element, or any other construction which can control the polarization state.

The operation of the optical-fiber amplifier of this embodiment will now be described. The first excitation light and the second excitation light outputted respectively from the first and second excitation light sources 122a, 122b are polarized so as to be perpendicular to one another and are then combined and divided by the excitation light combining and dividing device 128, whereupon they will be inputted to the respective rare-earth-doped optical fibers 121a, 121b by the respective multiwavelength combining devices 123a, 123b. Since the combining takes place after the polarization controlling, the combined light never cause fluctuation due to interference. In this embodiment, the excitation light combining and diving device 128 divides the power at a ratio of 1:1. Alternatively the power may be distributed at a ratio different from 1:1, depending on the power of output light of first and second excitation light sources 122a, 122b and the construction of the excitation light combining and dividing device 128.

Figure 11:
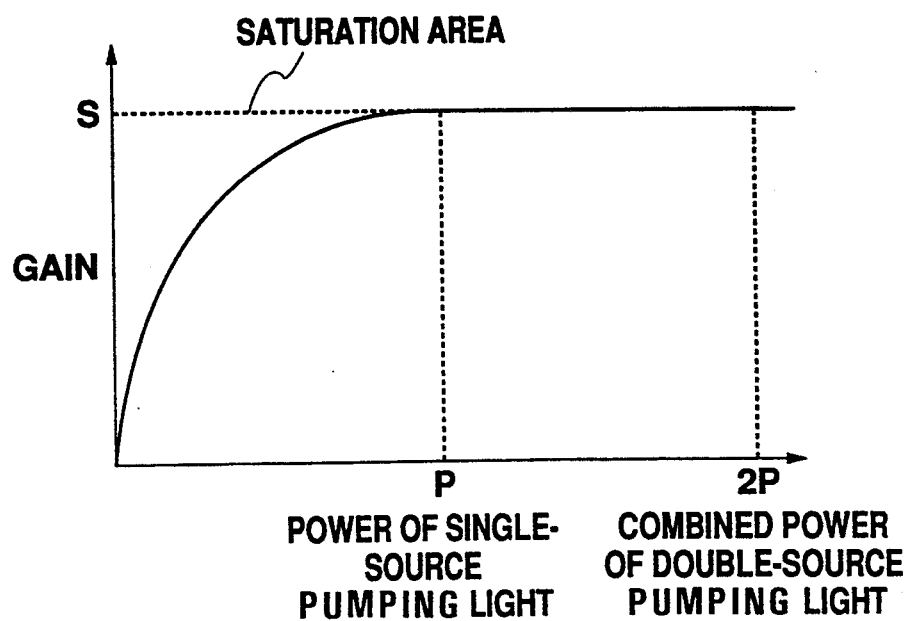
FIG. 11 is a graph showing the relation between excitation power and gain of the optical-fiber amplifier according to the first embodiment of FIG. 10.

Since the second excitation light outputted from the second excitation light source 122b is inputted to the first and second rare-earth-doped optical fibers 121a, 121b even in the presence of an abnormality in the first excitation light source 122a, the first and second rare-earth-doped optical fibers 121a, 121b will remain their amplifying action. At that time, as shown in FIG. 11, if the first and second rare-earth-doped optical fibers 121a, 121b are preset so as to be activated at a saturated area or at another area near the saturated area even by only the power P of the second excitation light outputted from the second excitation light source 122b, the combined light provides the power 2P so that the amplification gains of the first and second rare-earth-doped optical fibers 121a, 121b will not vary even when the first excitation light source 122a is cut off.

Figure 12:
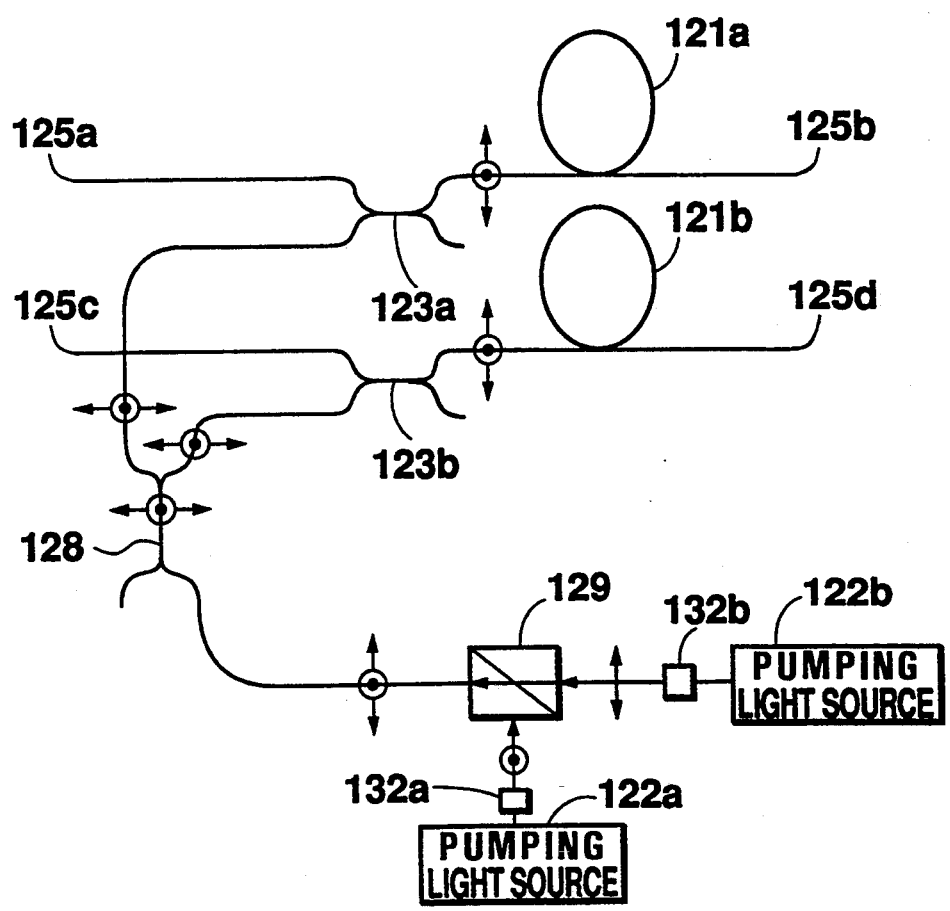
FIG. 12 is a diagram showing an optical-fiber amplifier according to a second embodiment of the invention.

FIG. 12 shows a second embodiment of the optical-fiber amplifier of the invention. In FIG. 12, reference numerals 121a, 121b designate first and second optical fibers doped of a rare earth element; 122a, 122b, first and second excitation light sources; 123a, 123b, first and second multiwavelength combining devices for combining signal light and excitation light; 129, a polarization separator for combining the first and second excitation light emitted from the first and second excitation light sources 122a, 122b; 128, an excitation light combining and dividing device; and 132a, 132b, first and second polarization controllers. The multiwavelength combining device may be a multiwavelength optical coupler, and the excitation light combining and dividing device may be an optical coupler.

The operation of the optical-fiber amplifier of this embodiment will now be described. The first excitation light and the second excitation light outputted respectively from the first and second excitation light sources 122a, 122b are polarized so as to be perpendicular to one another and are then combined and divided by the excitation light combining and dividing device 128, whereupon they will be inputted to the respective rare-earth-doped optical fibers 121a, 121b by the respective multiwavelength combining devices 123a, 123b. Since the combining takes place after the polarization controlling, the level of the combined excitation light is stable. In this embodiment, since the polarization separator 129 and the dividing device 128 are separate from one another, the power of excitation light to be divided by the dividing device 128 can be distributed selectively by controlling the dividing device 128, thus realizing a system which is more flexible than that of the first embodiment.

Since the second excitation light outputted from the second excitation light source 122b is inputted to the first and second rare-earth-doped optical fibers 121a, 121b even in the presence of an abnormality in the first excitation light source 122a, the first and second rare-earth-doped optical fibers 121a, 121b will remain their amplifying action. At that time, if the first and second rare-earth-doped optical fibers 121a, 121b are preset so as to be activated at a saturated area or at another area near the saturated area even by only the second excitation light outputted from the second excitation light source 122b, the amplification gains of the first and second rare-earth-doped optical fibers 121a, 121b will not vary even when the first excitation light source 122a is cut off.

Figure 13:
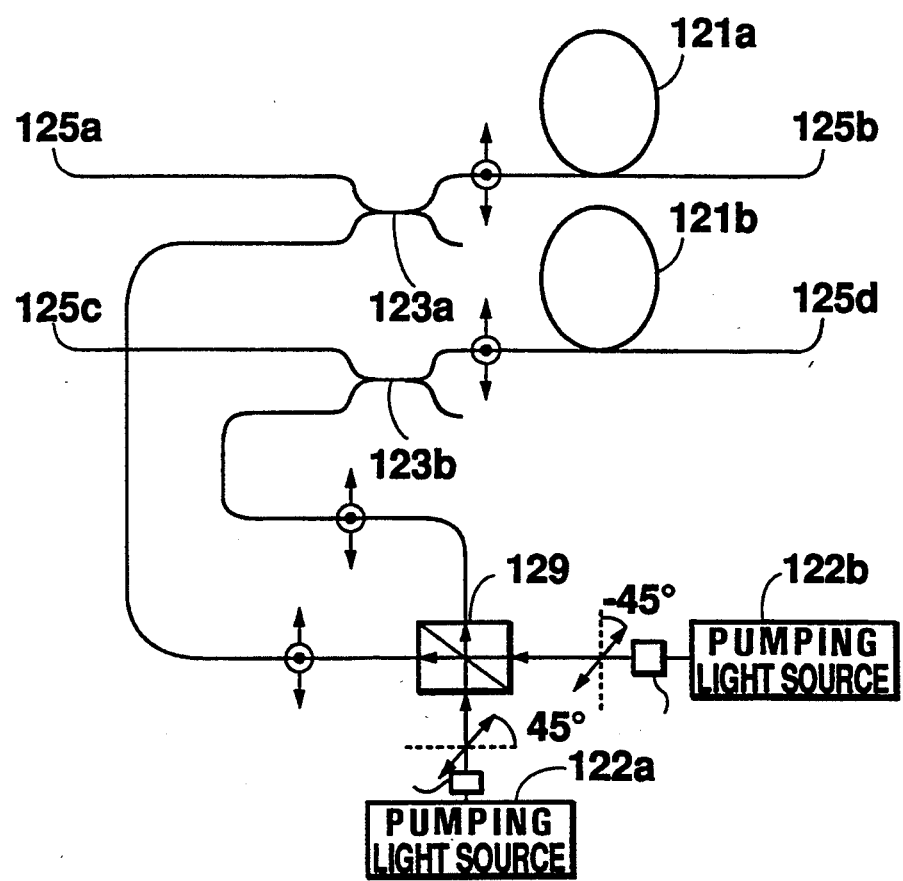
FIG. 13 is a diagram showing an optical-fiber amplifier according to a third embodiment of the invention.

FIG. 13 shows a third embodiment of the optical-fiber amplifier of the invention. In FIG. 13, reference numerals 121a, 121b designate first and second optical fibers doped of a rare earth element; 122a, 122b, first and second excitation light sources; 123a, 123b, first and second multiwavelength combining devices for combining signal light and excitation light; 129, a polarization separator for combining the first and second excitation light emitted from the first and second excitation light sources 122a, 122b; 128, an excitation light combining and dividing device; and 132a, 132b, first and second polarization controllers. The multiwavelength combining device may be a multiwavelength optical coupler, and the excitation light combining and dividing device may be an optical coupler.

The operation of the optical-fiber amplifier of this embodiment. The polarization controllers 132a, 132b control the first excitation light outputted from the first excitation light source 122a and the second excitation light outputted from the second excitation light source 122b in such a manner that their respective polarization planes are at +45 degrees and −45 degrees to a predetermined axis, whereupon the thus polarized excitation light is inputted to the polarization separator 129 for separation. Since the excitation light inputted to the polarization separator 129 has a polarization plane inclined by 45%, one half part of the excitation light is allowed to go straight while the other half part of the excitation light is reflected. Therefore each of the two parts of output light is combined of one half of the first excitation light and one half of the second excitation light. These two parts of output light are inputted to the first and second rare-earth-doped optical fibers 121a, 121b, which serve as amplifying media, via the first and second multiwavelength polarization combing devices 123a, 123b, respectively. Since the combining takes place after the polarization controlling, the level of the combined excitation light is stable.

Since the second excitation light outputted from the second excitation light source 122b is inputted to the first and second rare-earth-doped optical fibers 121a, 121b even in the presence of an abnormality in the first excitation light source 122a, the first and second rare-earth-doped optical fibers 121a, 121b will remain their amplifying action. At that time, as shown in FIG. 11, if the first and second rare-earth-doped optical fibers 121a, 121b are preset so as to be activated at a saturated area or at another area near the saturated area even by only the second excitation light outputted from the second excitation light source 122b, the amplification gains of the first and second rare-earth-doped optical fibers 121a, 121b will not vary even when the first excitation light source 122a is cut off.

Figure 14:
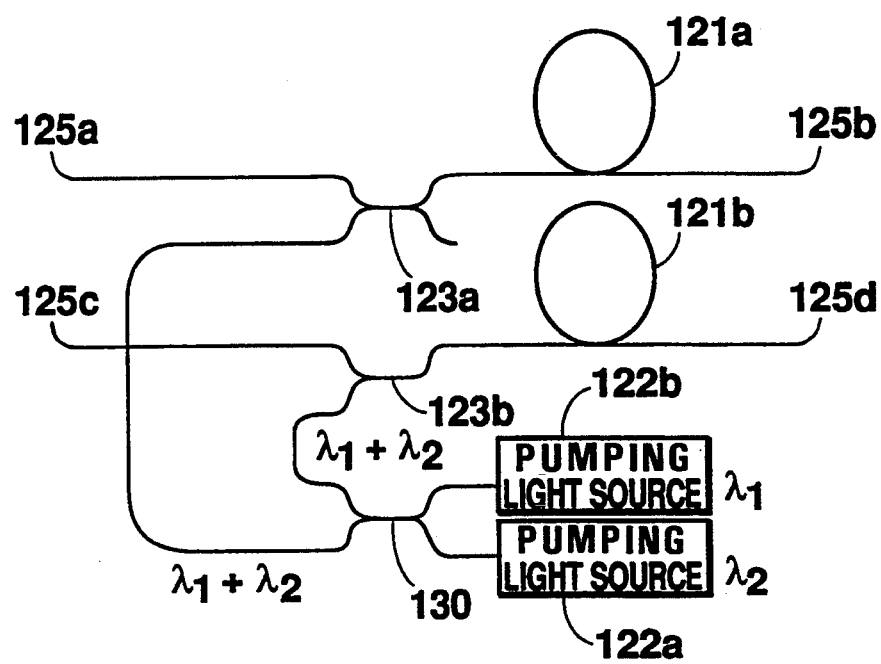
FIG. 14 is a diagram showing an optical-fiber amplifier according to a fourth embodiment of the invention.

FIG. 14 shows a fourth embodiment of the optical-fiber amplifier of the invention. In FIG. 14, reference numerals 121a, 121b designate first and second optical fibers doped of a rare earth element; 122a, 122b, first and second excitation light sources; 123a, 123b, first and second multiwavelength combining devices for combining signal light and excitation light; and 130, a multiwavelength combining and dividing device for combining the excitation light. The multiwavelength combining device may be a multiwavelength optical coupler.

The operation of the optical-fiber amplifier of this embodiment will now be described. The first excitation light outputted from the first excitation light source 122a and the second excitation light outputted from the second excitation light source 122b are different wavelength from one another and are combined and divided by the multiwavelength combining and dividing device 128 and are then inputted to the first and second rare-earth-doped optical fibers 121a, 121b by the multiwavelength combining devices 123a, 123b, respectively. Since the second excitation light outputted from the second excitation light source 122b is inputted to the first and second rare-earth-doped optical fibers 121a, 121b even in the presence of an abnormality in the first excitation light source 122a, the first and second rare-earth-doped optical fibers 121a, 121b will remain their amplifying action. At that time, as shown in FIG. 11, if the first and second rare-earth-doped optical fibers 121a, 121b are preset so as to be activated at a saturated area or at another area near the saturated area even by only the second excitation light outputted from the second excitation light source 122b, the amplification gains of the first and second rare-earth-doped optical fibers 121a, 121b will not vary even when the first excitation light source 122a is cut off. If Er-doped optical fibers are to be used as the amplifying media 121a, 121b, the respective wavelengths of the first and second excitation light sources 122a, 122b may be 1.48 μm and 0.98 μm. Thus first excitation light and second excitation light with different wavelengths can be combined together, with less interference.

Figure 15:
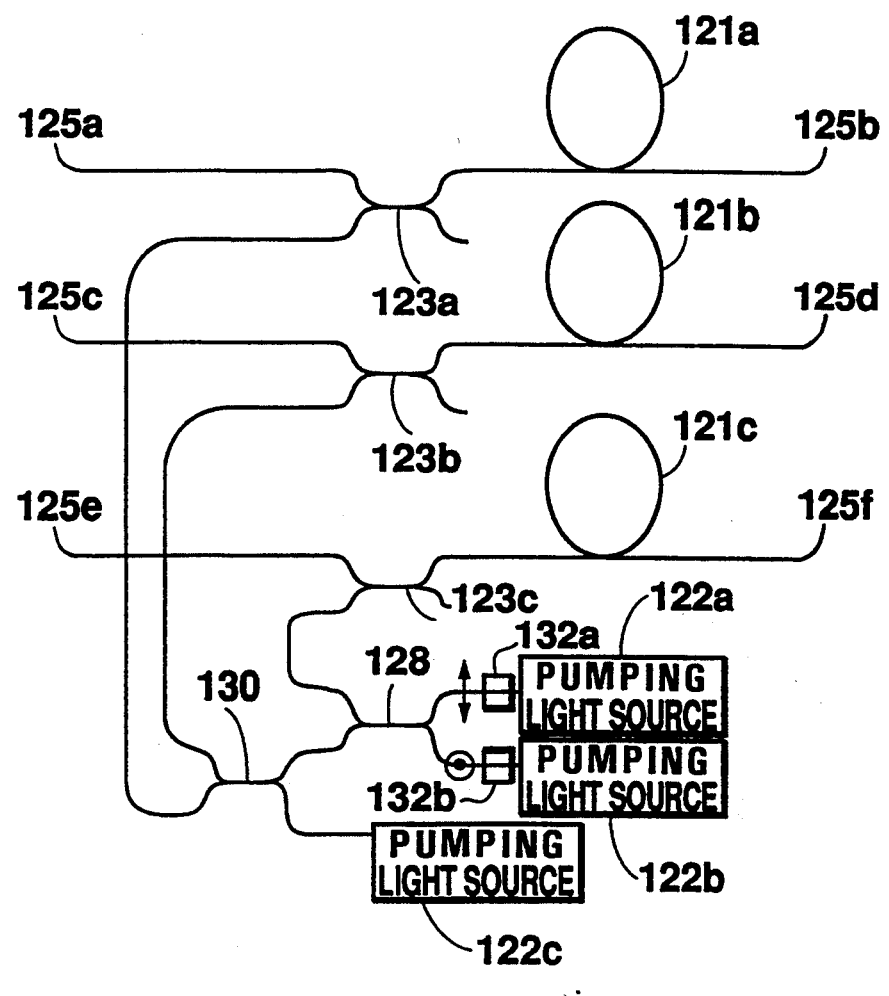
FIG. 15 is a diagram showing an optical-fiber amplifier according to a fifth embodiment of the invention.

FIG. 15 shows a fifth embodiment of the optical-fiber amplifier of the invention. In FIG. 15, reference numerals 121a, 121b, 121C designate first, second and third optical fibers doped of a rare earth element; 122a, 122b, 122c, first, second and third excitation light sources; 123a, 123b, 123c, first, second and third multiwavelength combining devices for combining signal light and excitation light; 128, an excitation light combining and dividing device; 130, a multiwavelength combining and dividing device for combining and dividing excitation light; and 132a, 132b, first and second polarization controllers. The multiwavelength combining device may be a multiwavelength optical coupler, and the excitation light combining and dividing device may be an optical coupler.

The operation of the optical-fiber amplifier of this embodiment will now be described. The first excitation light and the second excitation light, which have a wavelength k1, outputted from the first and second excitation light sources 122a, 122b are polarized so as to be perpendicular to one another and are then combined and divided by the excitation light combining and dividing device 128. Meanwhile, the output light of the combining and dividing device 128 and the third excitation light, which has a wavelength k2, outputted from the third excitation light source 122c are combined and divided by the multiwavelength combining and dividing device 130 and are then inputted to the first, second and third rare-earth-doped optical fibers 121a, 121b, 121c, which serve as amplifying media, by the first, second and third multiwavelength combining devices 123a, 123b, 123c, respectively. Since the second excitation light and the third excitation light outputted from the second and third excitation light sources 122b, 122c are inputted to the first, second and third rare-earth-doped optical fibers 121a, 121b, 121c by the first, second and third multiwavelength combining devices 123a, 123b, 123c, respectively, even in the presence of an abnormality in the first excitation light source 122a, the first, second and third rare-earth-doped optical fibers 121a, 121b, 121c will remain their amplifying action. At that time, if the first, second and third rare-earth-doped optical fibers 121a, 121b, 121c are preset so as to be activated at a saturated area or at another area near the saturated area even by only the second and third excitation light outputted from the second and third excitation light sources 122b, 122c, the amplification gains of the first, second and third rare-earth-doped optical fibers 121a, 121b, 121c will not vary even when the first excitation light source 122a is cut off. Thus two or more parts of excitation light can be combined and then can be divided into N parts to excite N amplifying media.

Figure 16:
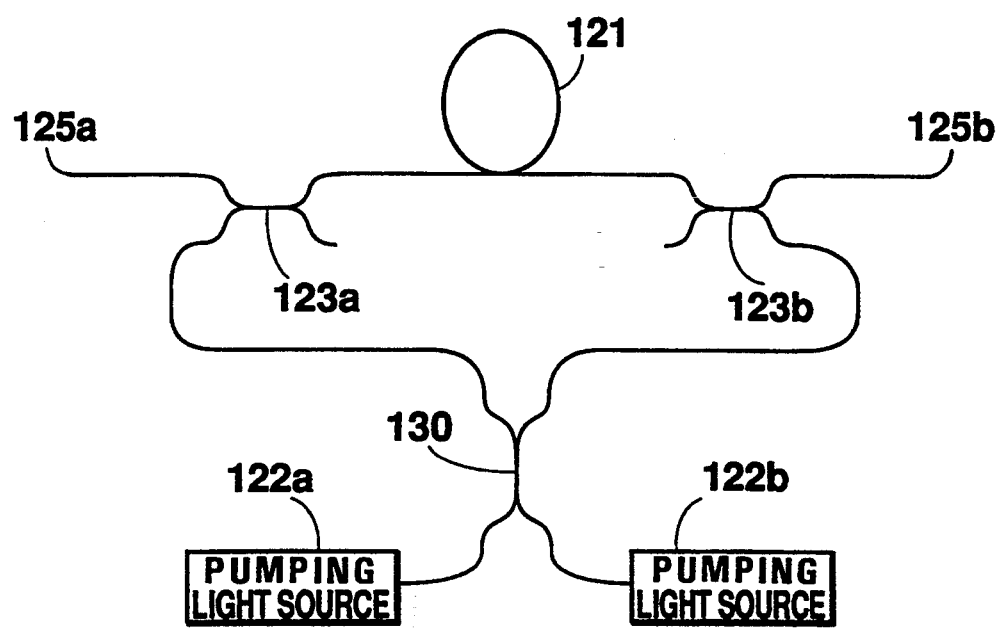
FIG. 16 is a diagram showing an optical-fiber amplifier according to a sixth embodiment of the invention.

FIG. 16 shows a sixth embodiment of the optical-fiber amplifier of the invention. In FIG. 16, reference numeral 121 designates an optical fiber doped of a rare earth element; 122a, 122b, first and second excitation light sources; 123a, 123b, first and second multiwavelength combining devices for combining signal light and excitation light; and 130, a multiwavelength combining and dividing device for combining and dividing the excitation light emitted from the first and second excitation light sources 122a, 122b. The multiwavelength combining device may be a multiwavelength optical coupler.

The operation of the optical-fiber amplifier of this embodiment will now be described. The first excitation light and the second excitation light, which have different wavelength, respectively outputted from the first and second excitation light sources 122a, 122b are combined and divided and are then inputted to the rare-earth-doped optical fiber 121 from opposite ends thereof by the first and second multiwavelength combining devices 123a, 123b, respectively. As the rare-earth-doped optical fiber 121 is excited from opposite ends, symmetrical inverted distribution will take place about the central portion of the rate-earth-doped optical fiber 121 so that the same amplification characteristic can be obtained even when signal light is inputted from either terminal 125a, 125b. Since the second excitation light outputted from the second excitation light source 122b is inputted to the first and second rare-earth-doped optical fibers 121a, 121b even in the presence of an abnormality in the first excitation light source 122a, the first and second rare-earth-doped optical fibers 121a, 121b will remain their amplifying action. At that time, if the first and second rare-earth-doped optical fibers 121a, 121b are preset so as to be activated at a saturated area or at another area near the saturated area even by only the second excitation light outputted from the second excitation light source 122b, the amplification gains of the first and second rare-earth-doped optical fibers 121a, 121b will not vary even when the first excitation light source 122a is cut off. Since the rare-earth-doped optical fiber 121 is excited from opposite ends even when an abnormality occurs in one excitation light source, symmetrical inverted distribution will take place about the central portion of the rare-earth-doped optical fiber 121 so that the same amplification characteristic can be obtained even when signal light is inputted from either terminal 125a, 125b.

Figure 17:
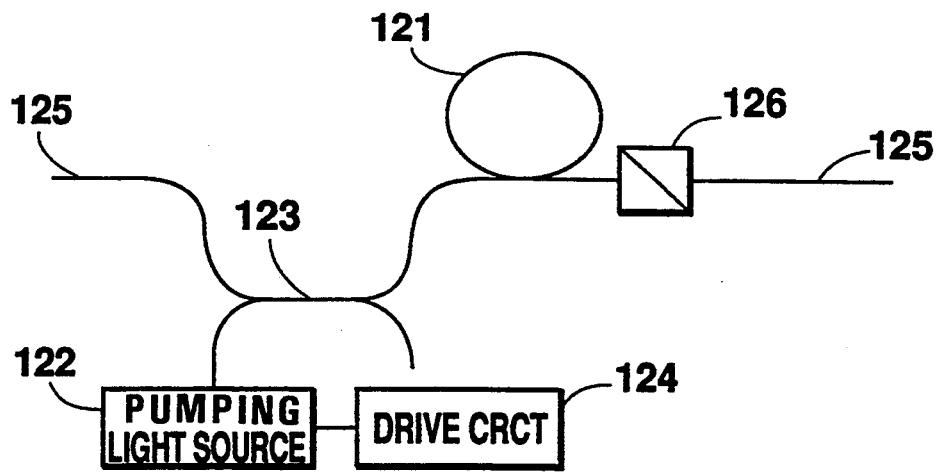
FIG. 17 is a diagram showing an optical-fiber light amplifier according to a seventh embodiment of the invention.

FIG. 17 shows an optical-fiber light amplifier according to a seventh embodiment of the embodiment. In FIG. 17, reference numeral 121 designates an optical fiber doped of a rare earth element; 122, an excitation light source; 123, an excitation light combining and dividing device; 124, an excitation light source driving circuit; 125, an optical fiber serving as a signal channel; and 126, a polarization regulator. The combining and dividing device 123 may be an optical coupler, and the polarization regulator 126 may be a polarizer.

Figure 22:
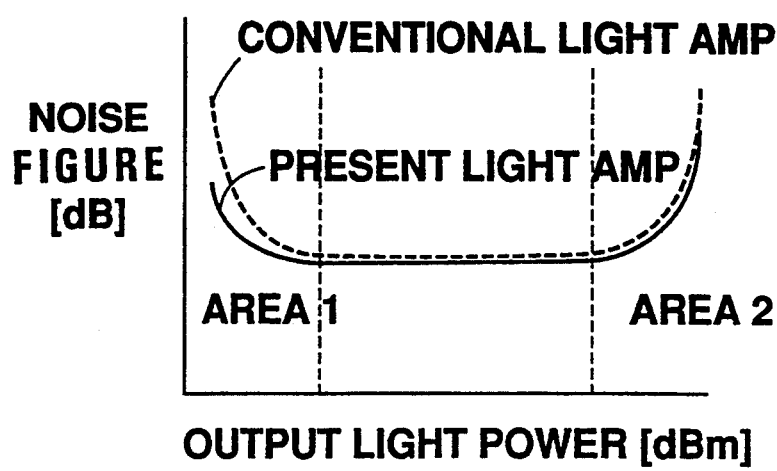
FIG. 22 is a graph showing the relation between output light power and noise index of the optical-fiber light amplifier according to this invention and the related art.

The operation of the optical-fiber light amplifier of this embodiment will now be described. The excitation light outputted from the excitation light source 122 is inputted to the rare-earth-doped optical fiber 121, which serves as an amplifying medium, by the excitation light combining and dividing device 123, and the signal light inputted from the optical fiber 125 is amplified. Since the polarization regulator 126 controls the excitation light in such a manner that the light in a polarized state equal to that of the amplified signal light transmits, it is possible to retard deterioration of the signal-to-noise ratio of signal light. The solid-line curve in FIG. 22 represents the noise index of the light amplifier of this invention, showing that the noise index is lowered in all areas. Since the main noise particularly in the area 1 is beat noise in natural emission light, it is seen that the noise index is lowered sharply in the area 1.

Figure 18:
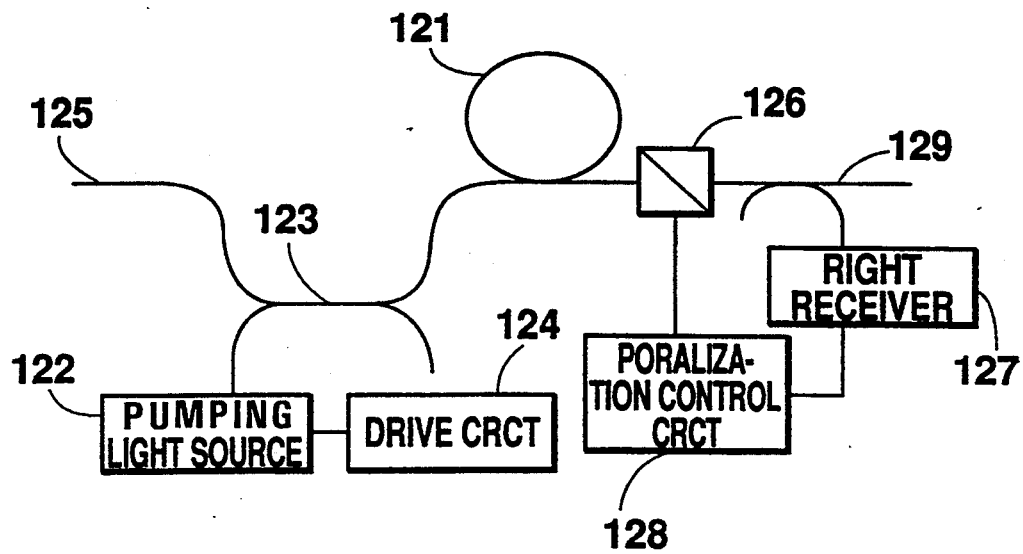
FIG. 18 is a diagram showing an optical-fiber light amplifier according to an eighth embodiment of the invention.

FIG. 18 is an eighth embodiment of the optical-fiber light amplifier of the invention. In FIG. 18, reference numeral 121 designates an optical fiber doped of a rare earth element; 122, an excitation light source; 123, a combining device for combining signal light and excitation light; 126, a polarization regulator; 129, a diving device for dividing part of output light; 127, a light detector (also called "light receiver") for measuring the power of the divided signal light; and 128, a control circuit for controlling the polarization regulator 126 in such a manner that the output of the light detector 127 becomes maximal. The light detector may be a photodiode, an avalanche photodiode or else.

The operation of the optical-fiber light amplifier will now be described. The excitation light outputted from the excitation light source 122 is inputted to the rare-earth-doped optical fiber 121, which serves as an amplifying medium, by the excitation light combining and dividing device 123, and the signal light inputted from the optical fiber 125 is amplified. Part of the amplified light signal is divided by the dividing device 129, and its power is measured by the light detector 127. If the polarization regulator 126 is controlled by the control circuit 128 in such a manner that the output of the light detector 127 becomes maximal, the polarization regulator 126 causes the light in a polarized state equal to the polarized state of the amplified signal light to transmit, following the change of the polarized state of the signal light. At that time, since the natural emission light component perpendicular to the polarized state of the signal light, it is possible to retard deterioration of the signal-to-noise ratio of signal light.

Figure 19:
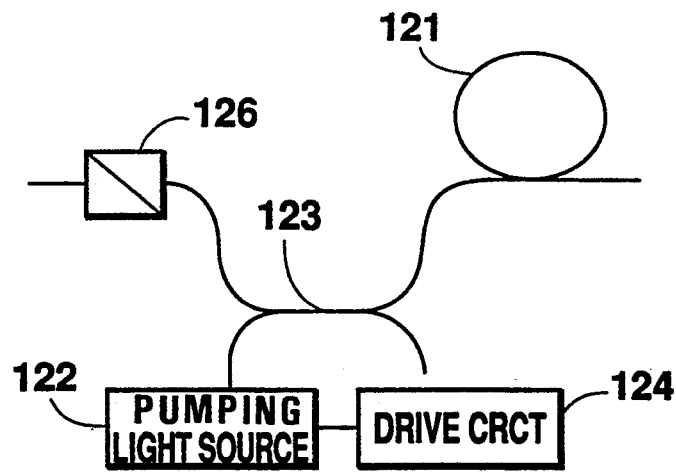

FIG. 19 shows a ninth embodiment of the optical-fiber light amplifier of the invention. In FIG. 19, reference numeral 121 designates a polarization-maintining fiber doped of a rare earth element; 122, an excitation light source; 123, a combining device for combining signal light and excitation light; and 126, a polarization regulator. The polarization regulator 126 regulates polarization in such a manner that the polarization plane of the signal light coincides the polarization plane of incidence of the rare-earth-doped polarization-maintaining fiber.

The operation of the optical-fiber light amplifier of this invention will now be described. The excitation light outputted from the excitation light source 122 is inputted by the combining and dividing device 123 to the rare-earth-doped optical fiber 121, which serves as an amplifying medium, and the signal light is thereby amplified. The polarization regulator 126 regulates polarization in such a manner that the polarization plane of the signal light coincides the polarization plane of incidence of the rare-earth-doped polarization-maintaining fiber. Since the natural emission light component perpendicular to the polarized state of the signal light does not transmit, it is possible to retard deterioration of the signal-to-noise ratio of signal light.

Figure 20:
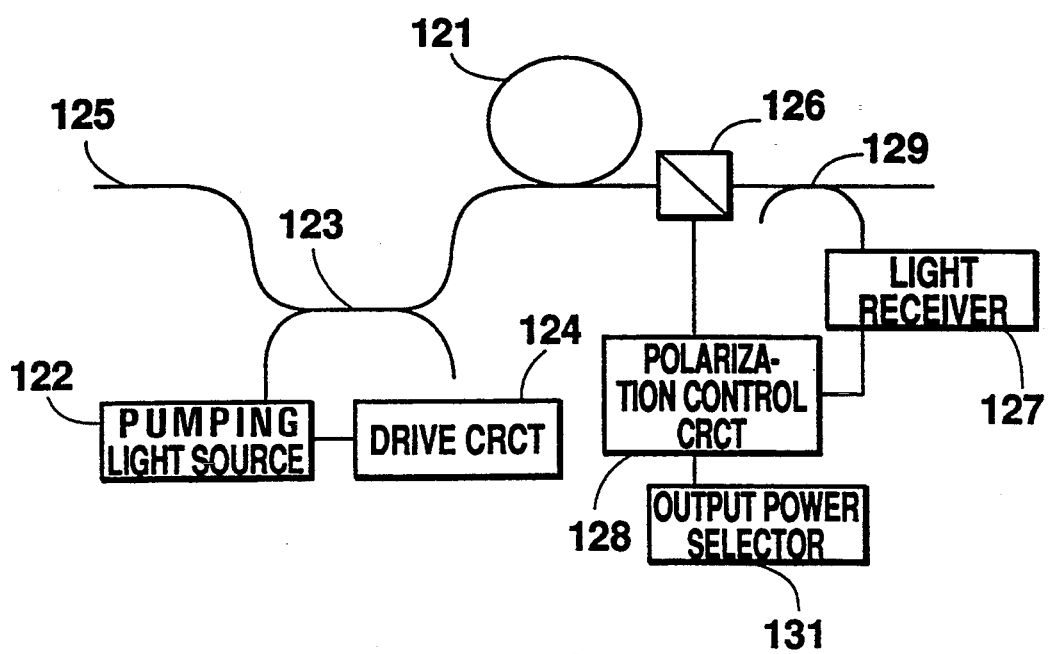
FIG. 20 is a diagram showing an optical-fiber light amplifier according to a tenth embodiment of the invention.

FIG. 20 shows a tenth embodiment of the optical-fiber light amplifier of the invention. In FIG. 20, reference numeral 121 designates an excitation light source; 123, a combining device for combining signal light and excitation light; 126, a polarization regulator; 129, a dividing device for dividing part of output light; 127, a light detector for measuring the power of the divided signal light; 128, a control circuit; and 131, a output power selector. The control circuit 128 controls the polarization regulator 6 based on the output of the output power selector 131 and the output of the light detector 127.

The operation of the optical-fiber light amplifier of this invention will now be described. The excitation light outputted from the excitation light source 122 is inputted to the rare-earth-doped optical fiber 121, which serves as an amplifying medium, by the combining and dividing device 123, and the signal light inputted from the optical fiber 125. Part of the amplified light signal is divided by the dividing device 129, and its power is measured by the light detector 127. The control circuit 128 controls the polarization regulator 126 in such a manner that the power of the light detector 127 and the power of the output power selector 131 become equal to one another. Since the control circuit 128 changes the polarized state of the polarization regulator 126, through which the signal light is to be transmitted, so as to regulate fluctuation of level of the output light power, it is possible to output a constant level of power. Assuming that the polarization regulator 126 has a range of control such that the angle between the polarization plane, through which light is to be transmit, and the polarization plane of the signal light ranges from 0 to 45 degrees, the natural emission light component perpendicular to the polarized state of the signal light will be reduced to retard deterioration of signal-to-noise ration of the signal light.

Figure 21:
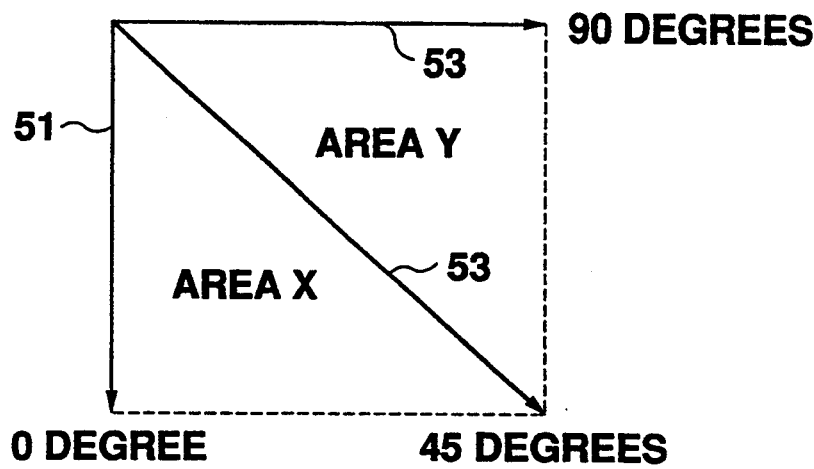
FIG. 21 is a diagram illustrating the operation of a polarization controller shown in FIG. 20.

FIG. 21 illustrates the operation of the polarization regulator 126, which operates the within the range indicated by the area X, i.e. from 0 to 45 degrees. An arrow 51 indicates the case in which the angle between the polarization plane, through which light is to be transmitted, and the polarization plane of the signal light is 0 degree; in this case, the signal light is transmitted, while the natural emission light component (i.e., in the direction indicated by an arrow 53) perpendicular to the signal light is cut off. In the case indicated by an arrow 52, the signal light is transmitted to ½ while the natural emission light component is cut off to ½. Therefore, assuming that the angle is varied between the arrows 51, 52, i.e. within the area X), the output of the signal light can be in the range between 100% and 50% while the natural emission light component of the direction indicated by the arrow 53 can be cut off in the range between 100% and 50%, improving the signal-to-noise ratio. In the area Y, partly since the signal light is transmitted in only the range between 0% and 50% and partly since the natural emission light component in the direction indicated by the arrow 53 is transmitted in the range between 50% and 100%, thus deteriorating the signal-to-noise ratio. Accordingly, if the polarization regulator is preset to operate within the range between 0 and 45 degrees, it is possible to adjust the output of the signal light and, at the same time, to improve the signal-to-noise ratio.

In the foregoing embodiments, the polarization regulator is a polarizer. Alternatively the polarization regulator may be a combination of a polarizer and a polarized-state changing means. The polarized-state changing means may be a polarization controller composed of a k/4 plate and a k/2 plate, may utilize a Faraday rotating device, or may be any other form.

Further in the foregoing embodiments, the light amplifying means is a rare-earth-doped optical fiber. Alternatively the amplifying means may be a semiconductor laser amplifier.

In multi-repeater transmission using two or more light amplifiers, since the natural emission light component, whose polarization plane is perpendicular to that of the signal light, is eliminated or reduced, it is possible to retard saturation of the light amplifier.

Figure 23:
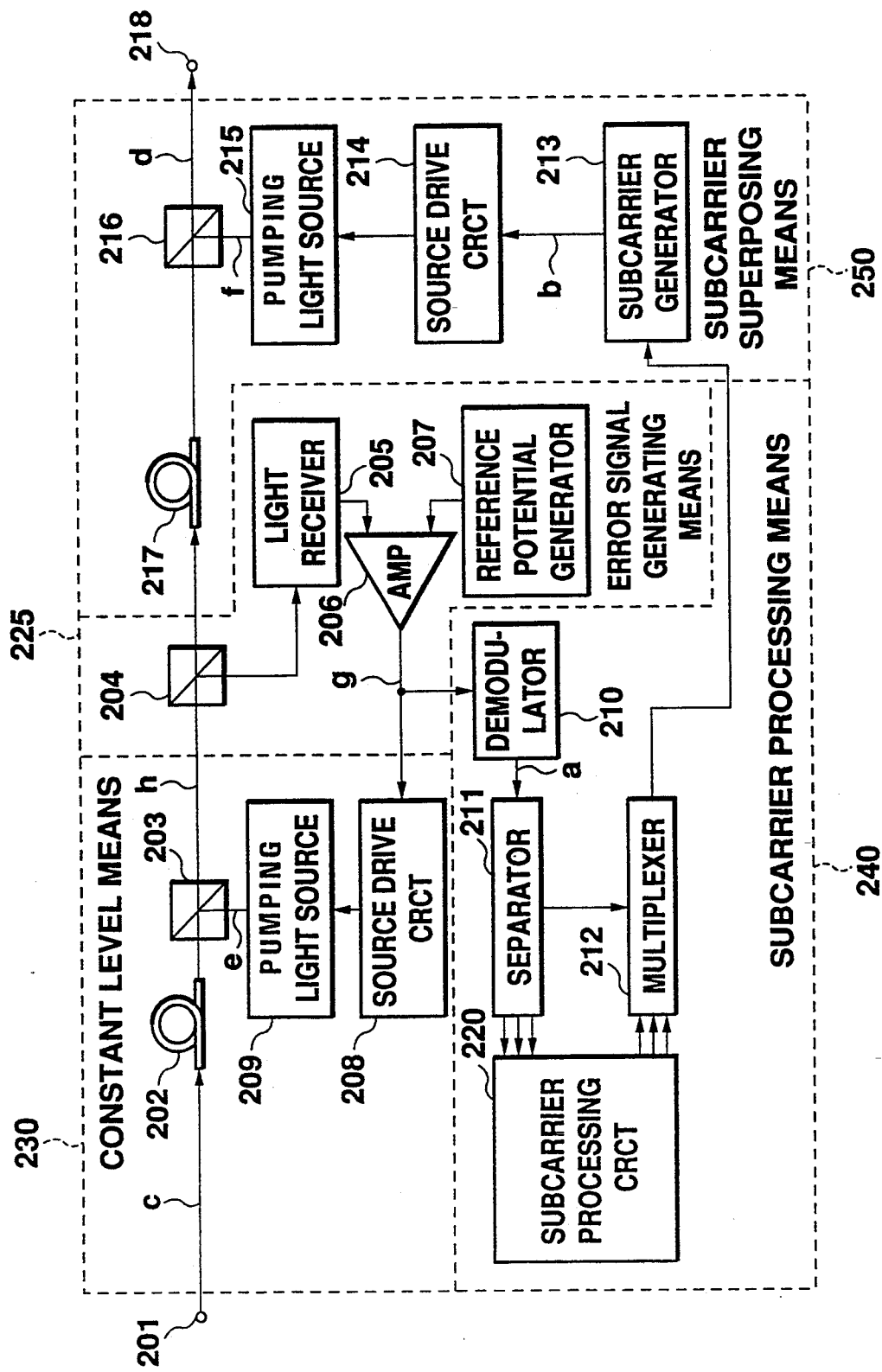
FIG. 23 is a block diagram showing a light repeating system according to an eleventh embodiment of the invention.

FIG. 23 shows a light repeating system according to an eleventh embodiment of the invention. In FIG. 23, reference numeral 201 designates an input terminal for main signal light; 202, 217, rare-earth-doped optical fibers; 203, 216, multiwavelength optical coupler; 204, a light-branching coupler; 205, a light receiver; 206, a differential amplifier; 207, a reference potential generator 208; 214, an excitation light source drive circuit; 215, an excitation light source; 210, a demodulator; 211, a separator; 212, a multiplexer; 213, a subcarrier generator; 218, an output terminal for main signal light; a, a first subcarrier; b, a second subcarrier; c, main signal light on which the first subcarrier is superposed; d, main signal light on which the second subcarrier is superposed; e, excitation light; g, a level error signal; and h, amplified light.

Further, 225 designates an error signal generating means for inputting the light signal, on which the first subcarrier is superposed, to compare it with a predetermined reference value and for generating an error signal based on the result of comparison; 230, a constant level circuit for making an inputted light signal to be a constant level, based on the error signal; 240, a subcarrier processing means for detecting and processing the first carrier based on the error signal generated from the error signal generator 225; and 250, a subcarrier superposing means for generating a second subcarrier based on the process of the subcarrier processing means 240 and for superposing the second subcarrier on the light signal.

The operation of the light repeating system of this embodiment will now be described with reference to FIG. 23. The main signal light c, on which the first subcarrier a as a low-frequency signal is superposed, is inputted to the input terminal 201 from the front-stage light amplification repeating system. The light-branching coupler 204 branches part of the main signal light c, on which the first carrier signal a is superposed, from the input terminal 201; one of the branched output sides is connected to the rare-earth-doped optical fiber 217, while the other output side is connected to the light receiver 205 which receives part of the main signal light c. When the light level of the main signal light c, on which the first subcarrier a is superposed, is constant, the light output of the excitation light source 209 is regulated by the excitation light source drive circuit 208 so as to be a predetermined constant value. But for example when the main signal light c is modified intensely with the first subcarrier a, i.e. a low-frequency signal, the light level of the main signal light c will not be constant; in this instance, the contant level amplifying means 230 operates so as to make the light level constant. As the light level varies, the light level at the light receiver 205 also varies. The light receiver 205 converts the light level photoelectrically. Meanwhile the differential amplifier 206 compares the light level with the level of the reference potential generator 207 and outputs the difference in level as a level error signal g resulting from the first subcarrier a superposed on the main signal light.

The excitation light source drive circuit 208 regulates the output level of the excitation light e of the excitation light source 209 based on the level error signal g, and the regulated light enters the rare-earth-doped optical fiber 202 from the multiwavelength combining device 203. Partly since the rare-earth-doped optical fiber 202 is a single-mode fiber having a length of several meters to several tens of meters and doped of a rare earth element such as erbium (Er), and partly since the excitation light e of the excitation light source 209 is excited behind the multiwavelength combining device 203, the rare-earth-doped optical fiber 202 causes inverted distribution so that the main signal light from the input terminal 201 is amplified by induced emission. As a result, the excitation light source drive circuit 208 of the constant level amplifying means 230 controls the excitation light source 209 in such a manner that the first subcarrier a and the level error signal g are inverted in phase, and the excitation light e is excited at the rare-earth-doped optical fiber 202, thus obtaining the amplified light h whose light level is stable.

The subcarrier processing means 240 controls the light repeating system using the first subcarrier a, as the level error signal g of the differential amplifier 206 is demodulated by the demodulator 210, is separated by the separator 211 and is processed by the subcarrier processing circuit 220.

The multiplexer 212 inputs the signal from the separator 211, the first subcarrier a and the signal from the subcarrier processing circuit 220, and then multiplexes these signals over the signal from the light repeating system.

The subcarrier superposing means 250 outputs the main signal light, which the second subcarrier b is superposed on the second amplified light h stabled in a constant level in the fiber, by the same action as mentioned above, as the first subcarrier b is generated from the subcarrier generator 213 by the repeating system, as the excitation light source 215 is controlled by the excitation light source drive circuit 214 and as the excitation light f of the excitation light source 215 is excited at the rare-earth-doped optical fiber 217 behind the multiwavelength combining device 216.

As mentioned above, according to this embodiment, the light amplification repeating system equipped with light amplifier comprises: a first optical fiber, which is doped of a light amplifying medium, for inputting main signal light, on which a first subcarrier is superposed, and for outputting a first amplified light; a first excitation light source for generating first excitation light to excite the first optical fiber; a first multiwavelength optical coupler connected to the first optical fiber to multiplex wavelengths; a first excitation light source drive circuit for driving the first excitation light source; a light-branching coupler for branching the first amplified light; a light receiver for converting the branched output light of the light-branching coupler photoelectrically; a reference potential generator for selecting a reference potential to compare an electrical signal from the light receiver with the predetermined reference value; a differential amplifier for comparing the output signals from the light receiver and the reference potential generator and for outputting a level error signal based on the result of comparison; a demoduulator for inputting the level error signal, i.e. the first subcarrier sampled, from the differential amplifier and for demodulating the inputted signal; a second optical fiber doped of a light amplifying medium for inputting the first amplified light and for outputting second amplified light; a second excitation light source for generating second excitation light to excite the second optical fiber; a second multiwavelength optical coupler connected to the second optical fiber for multiplexing the second excitation light over the first amplified light; a second excitation light source drive circuit for driving the second excitation light source; and a subcarrier generator connected to the second excitation light source drive circuit for superposing the second subcarrier on the second excitation light from the second excitation light source.

In this case, the first subcarrier a and the second subcarrier b may have a common carrier frequency.

Figure 24A:
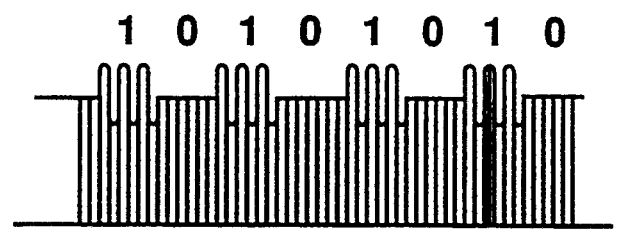
FIGS. 24A and 24B are diagrams illustrating the operation of the light repeating system when a subcarrier is modulated by amplitude shift keying.
Figure 24B:
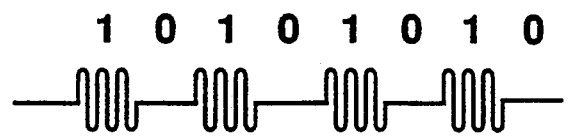

Each of the first and second subcarriers a and b may be a carrier wave modified with supervisory information (in this case, 1, 0, 1, 0, 1,. . .) by amplitude shift keying, as shown in FIG. 24A. The demodulator for demodulating the subcarrier samples a modulated signal of FIG. 24B by inputting the main signal light, on which the subcarrier is superposed, by the light receiver, then converting the inputted main signal light photoelectrically and finally transmitting the converted signal through a band-pass filter which permits only the modulated-frequency component of the subcarrier to pass. Then when the modulated signal is square-law-detected or synchronous-detected, the light amplification repeating system can obtain supervisory information. Of course an alternative modulation (e.g., FSK or PSK) may be used.

Figure 25A:
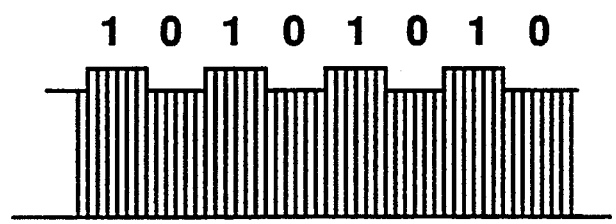
FIGS. 25A and 25B are diagrams illustrating the operation of the light repeating system when a subcarrier is a base-band PCM signal.
Figure 25B:
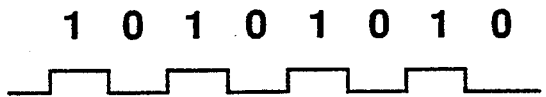

FIGS. 25A and 25B show supervisory information directly modulated by PCM. The light amplification repeating system can obtain supervisory information in the same method as the ASK modulation.

According to this embodiment, since the light repeating system has a second light amplifier for modulation, the subcarrier b outputted from the subcarrier generator 213 can control the excitation light source 215, totally regardless of the degree of modulation of the front-stage subcarrier a.

In this embodiment, the main signal light c is inputted in the light amplification repeating system all the time. However, if breakage of the fiber happens to occur upstream of the light amplification repeating system or the upstream light amplification repeating system happens to be faulty, the main signal light c cannot be inputted to the light amplification repeating system. In this instance, with the system having the same construction as the previous embodiment, assuming that the excitation light from the excitation light source 215 is modulated and that the second subcarrier b is transferred with natural emission light as a carrier wave, it is possible to transfer the subcarrier even in the absence of the main signal light c.

Figure 26:
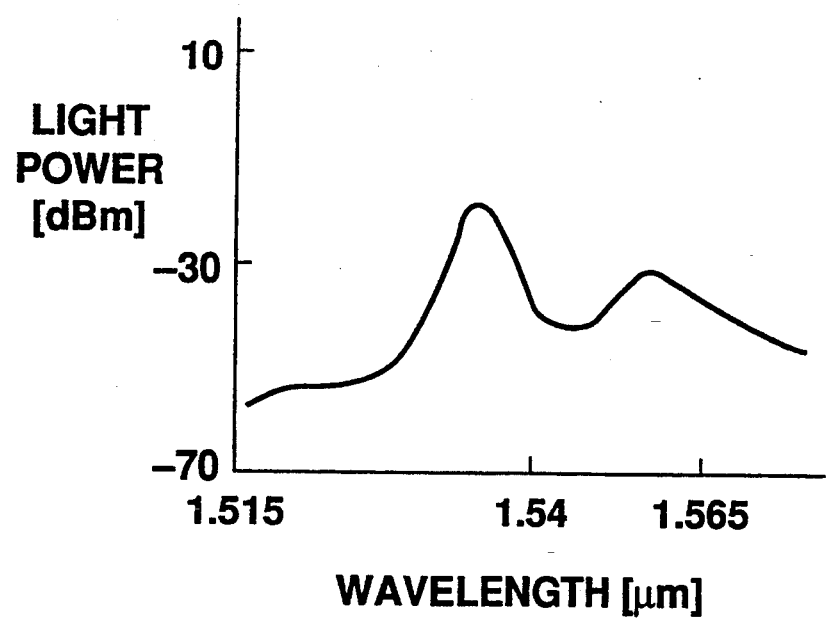
FIG. 26 is a graph showing a natural emission light spectrum of the light amplifier when a main signal is not inputted.
Figure 27:
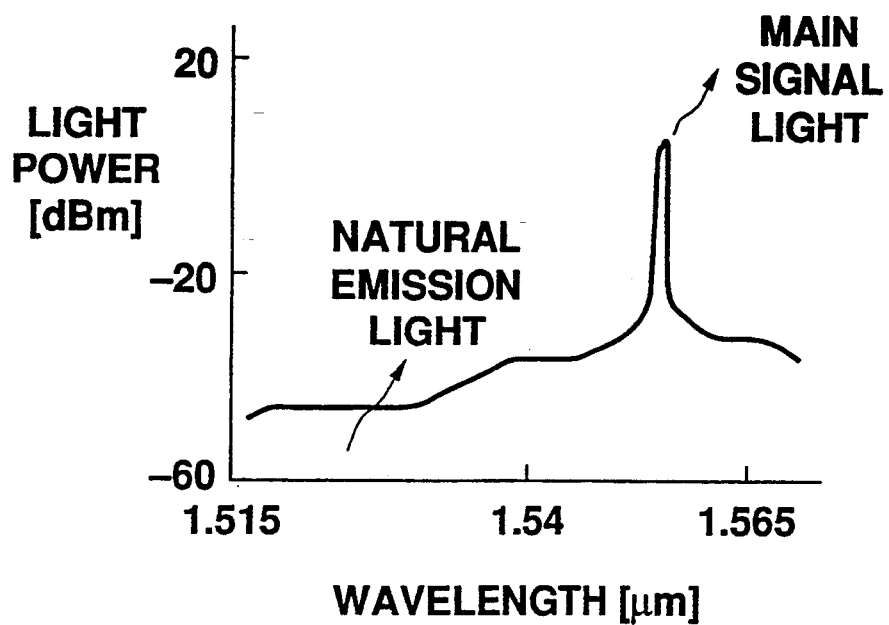
FIG. 27 is a graph showing a natural emission light spectrum of the light amplifier when a main signal is inputted.

FIG. 26 shows a natural emission light spectrum of the light amplifier when the main signal light c is not inputted, and FIG. 27 shows a natural emission light spectrum of the light amplifier when the main signal light c is inputted. In the presence of the main signal light c inputted, since the energy of the light amplifier is used in amplification of the main signal light c, the level of the natural emission light is low. But in the absence of the main signal light c inputted, no induced emission occurs to increase the level of the natural emission light. When the main signal light c is cut off, the second subcarrier b should be transferred with this high-level natural emission light as a carrier wave.

Figure 28:
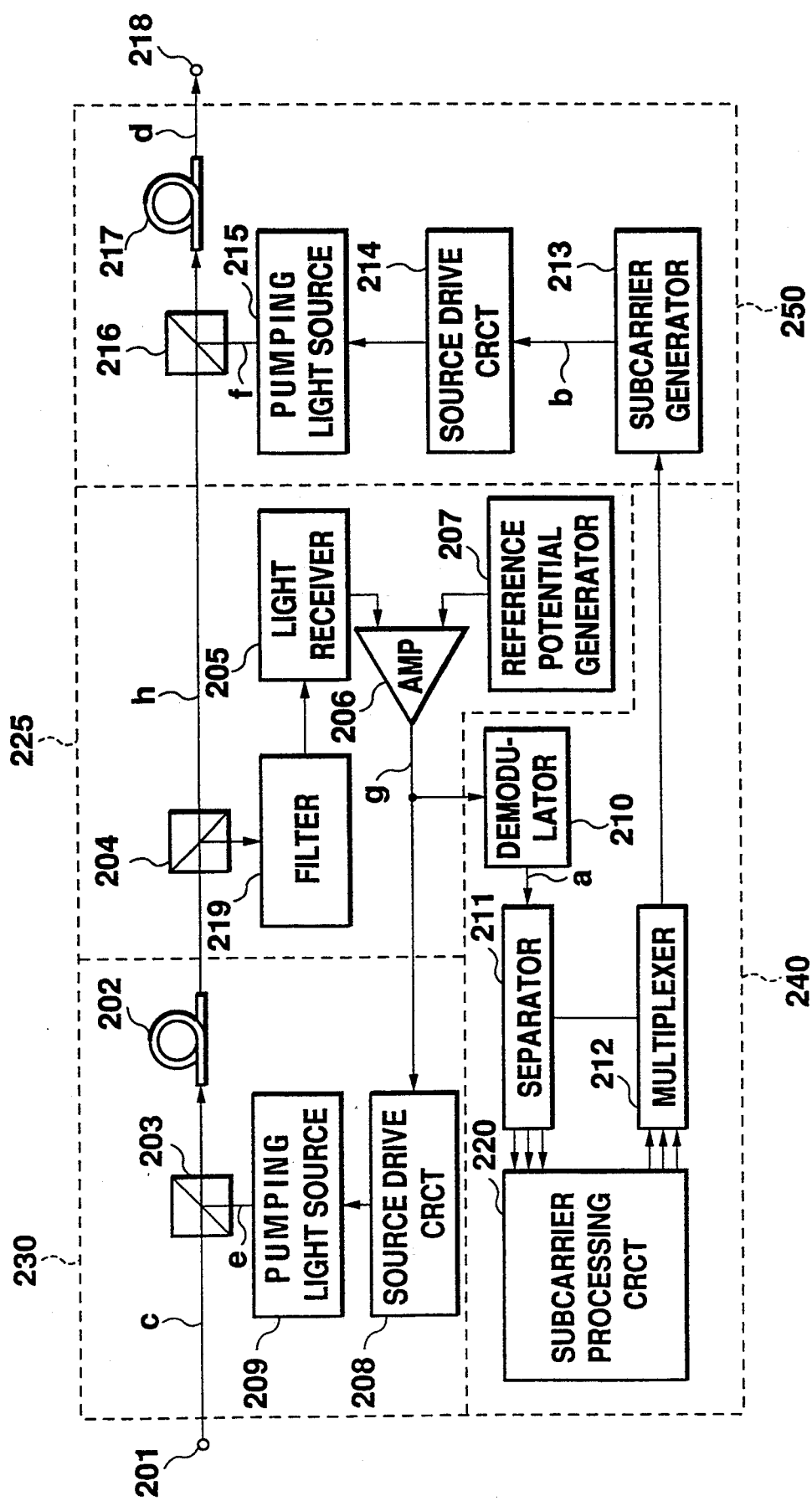
FIG. 28 is a block diagram showing a modified light repeating system of the eleventh embodiment of the invention.
Figure 29:
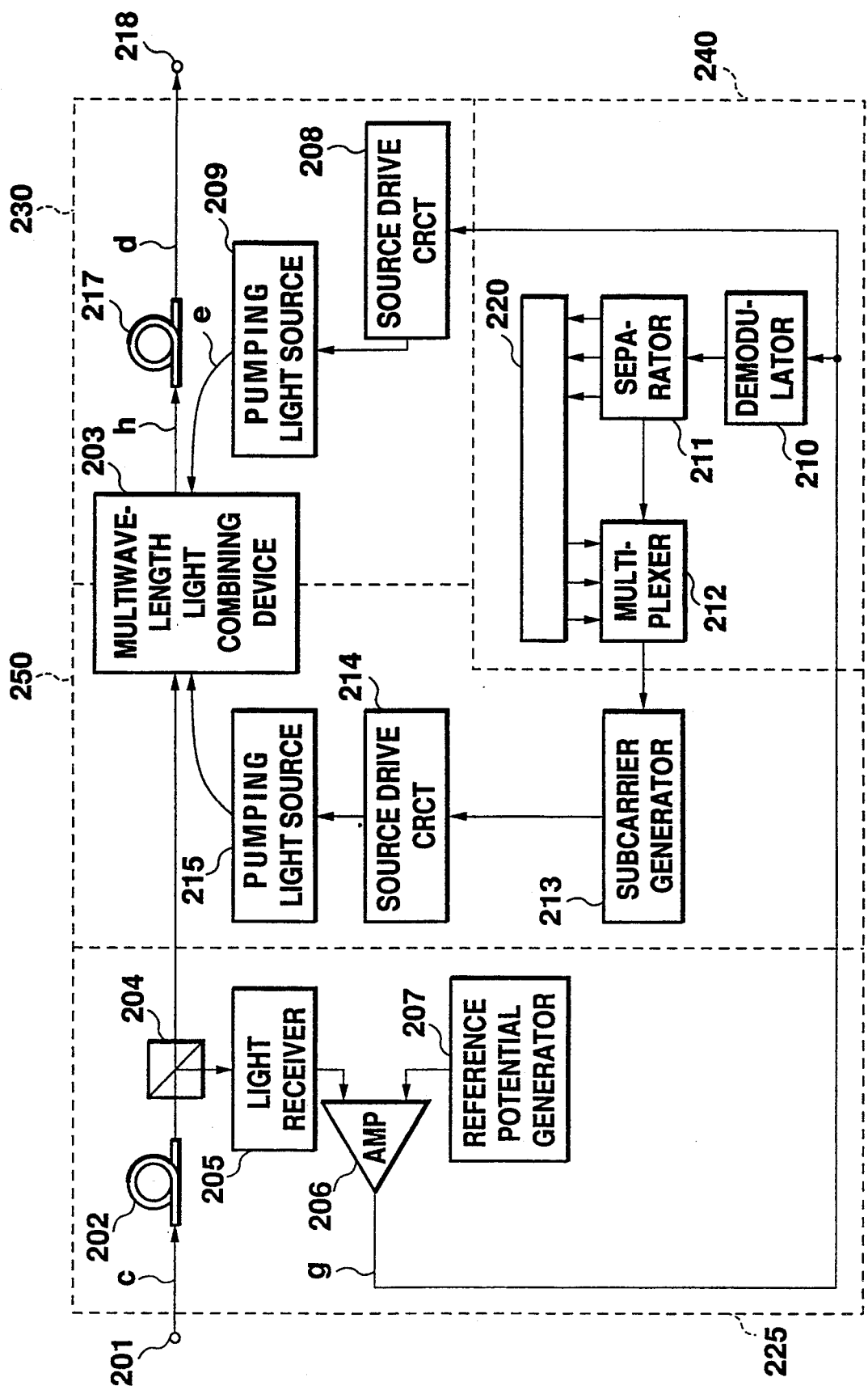
FIG. 29 is a block diagram showing another modified light repeating system of the eleventh embodiment of the invention.

In this embodiment, the rare-earth-doped optical fiber 202, 217 is excited by back excitation. Alternatively, the same result as this embodiment can be expected also in the case of front excitation as shown in FIG. 28. Designated by 219 is a band-pass filter.

Further, in this embodiment, two multiwavelength couplers are used. Alternatively the same result can be expected even with a single multiwavelength coupler.

It is a common knowledge that is is possible to reduce the intensity noise, which is due to the mode hopping, of an LD by superposing a large-amplitude high-frequency signal on the LD. This concept utilizes the characteristic that the LD oscillates pulses when the bias current of the LD crosses a threshold; at that time, the LD oscillates in various modes so that the mode hopping is retarded.

The present inventors discovered that the intensity noise observed in the output of the light amplifier was chiefly caused by the intensity noise generated from the excitation LD. The intensity noise of the excitation LD modulates the gain of the light amplifier, and as a result, the intensity noise observed in the output of the light amplifier will increase. The main cause for the intensity noise of the excitation LD is the mode hopping noise.

As the vertical mode of an LD hops to the next mode due to the change such as of temperature, various modes oscillate competively, causing the intensity noise. This phenomenon was discussed in detail in, for example, "Fundamentals of Semiconductor Laser" edited by the Japan Applied Physics Society, published 1987 from Ohm Co., Ltd. Mode hopping noise occurs markably in the low-frequency area in particular. Since the subcarrier has only a very low-frequency band of 1 to 100 kHz, it will be affected very much by this kind of intensity noise.

The present inventors discovered that it is possible to reduce the intensity noise of a light amplifier if this technology is adopted in the excitation LD. Specifically they discovered that there existed a great intensity noise in the excitation LD used in the conventional light amplifier and that this intensity noise modulated the gain of the light amplifier, thus causing the intensity noise of the light amplifier. If the intensity noise of the excitation LD itself is reduced, the intensity of the light amplifier will be reduced.

Following are embodiments described in connection with these discoveries.

Figure 30:
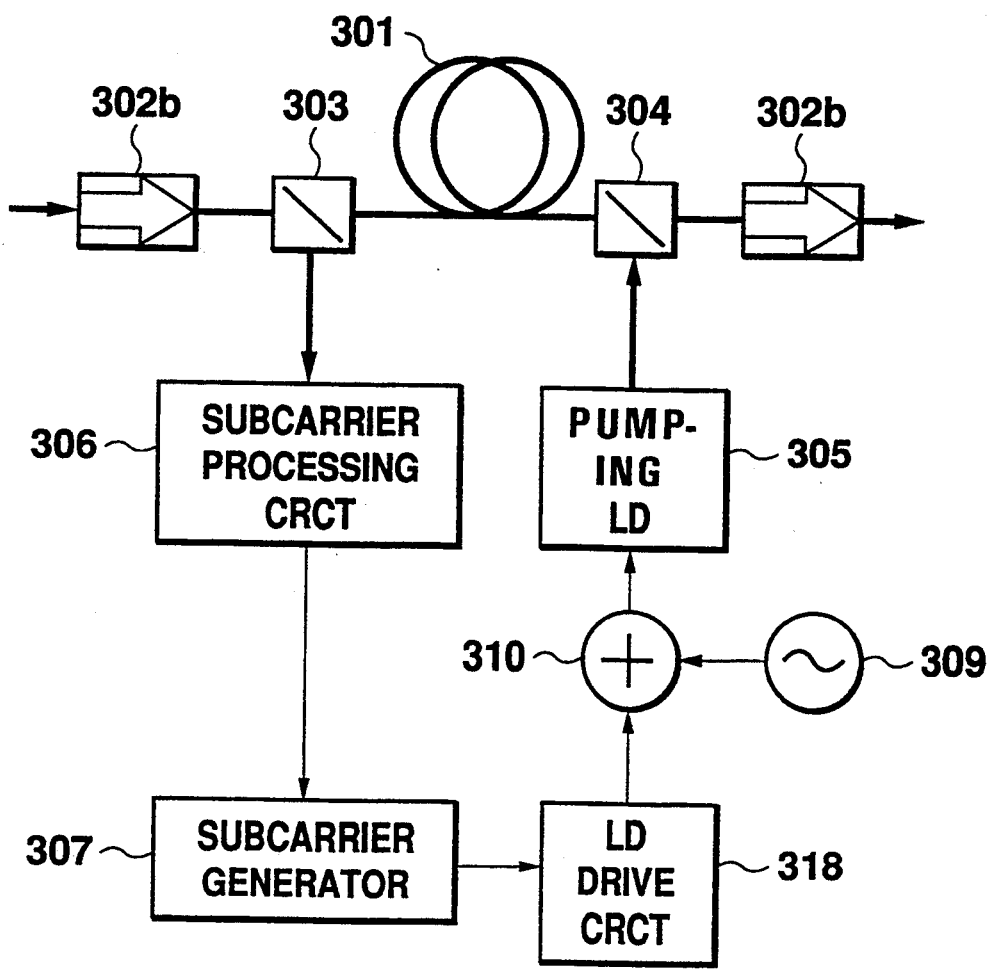
FIG. 30 is a diagram showing an excitation LD according to a twelfth embodiment of the invention.

FIG. 30 shows a twelfth embodiment of this invention. In FIG. 30, reference numeral 301 designates an erbium-doped fiber; 302a, 302b, optical isolators; 303, a light dibiding device; 304, a light combining device; 305, an excitation LD; 306, a subcarrier processing circuit; 307, a subcarrier generator; 318, an excitation light drive circuit; 309, a high-frequency oscillator; and 310, an adder.

In operation, the subcarrier generator 307 generates binary information a(t) [=1 or 0] upon receipt of information from the subcarrier processing circuit 306. This binary information is predomdulated by a subcarrier $S_c(t)$ expressed by equation (1) and yields a subcarrier $S_y(t)$ expressed by equation (2).

$$S_c(t) = A \cos(2p f_s t + H) \quad (1)$$

$$S_y(t) = A \times a(t) \cos(2p f_s t + H) \quad (2)$$

The subcarrier $S_y(t)$, which is the output of the excitation LD drive circuit of FIG. 30, is added to the output waveform of the high-frequency oscillator, which generates a large-width high-frequency expressed by equation (3), by an adder 310.

$$H(t) = B \cos(2p f_r t + w) \quad (3)$$

H(t) is a high-frequency (usually over 600 MHz) near the relaxation oscillation frequency.

The high-frequency-modulated wave, which is the output of the adder 310, is superposed on the bias current Ib of the exitation LD 305. Finally a current I(t) flowing in the excitation lD is expressed by equation (4).

$$I(t) = S_s(t) + H(t) + Lb \quad (4)$$
$$= A \times a(t) \cos(2t) = A \cos(2pf_st + H) +$$
$$B \cos(2pf_rt + w)$$

The maximal value of the bias current is below a threshold current of the excitation LD. This condition is expressed by equation (5).

$$Ib - A - B \not\geq Ith \quad (5)$$

Figure 31:
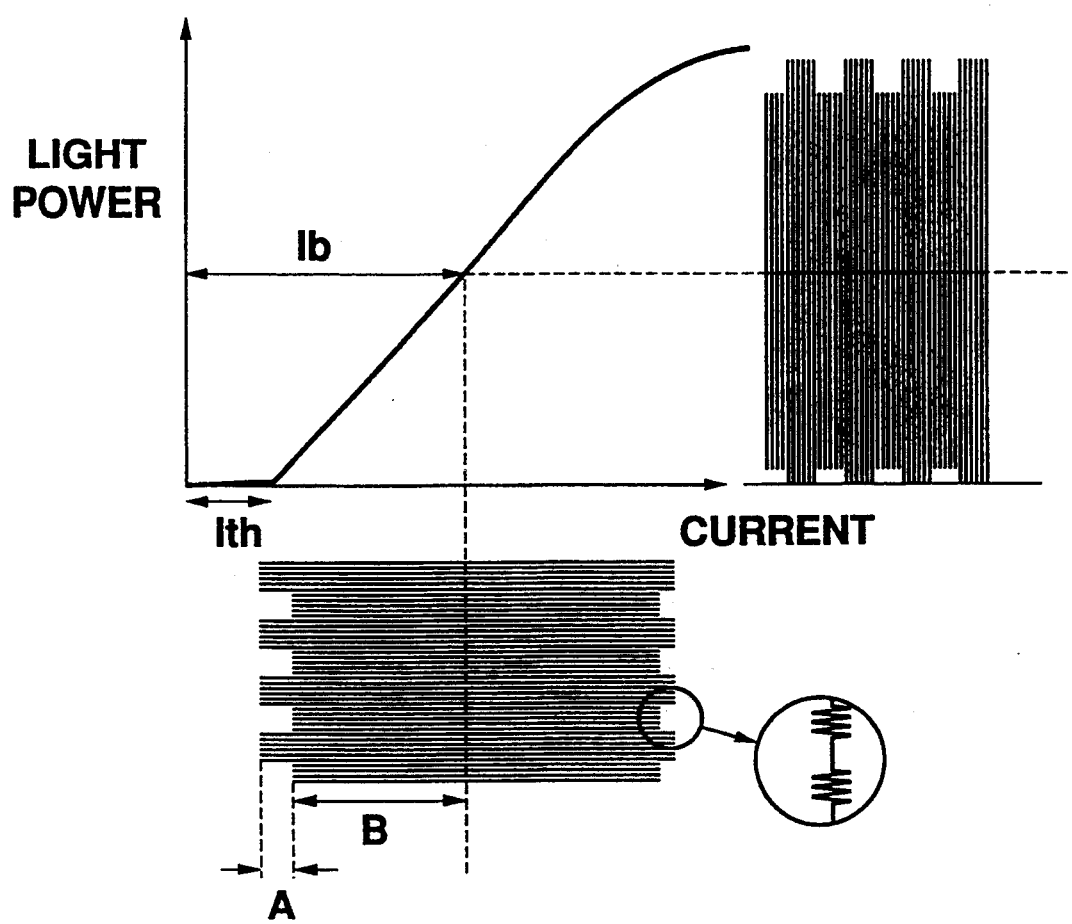
FIG. 31 is a graph showing an input/output characteristic of the excitation LD of the twelfth embodiment.

FIG. 31 shows the relation between current and output light power of the excitation LD. In the conventional art, the premodulated subcarrier is only superposed on the biasing current Ib, which is a direct current, of the excitation LD. Whereas in this embodiment, a high-frequency signal far higher than the subcarrier is superposed. The amplitude of a high-frequency signal to be superposed should be preset in such a manner that the maximal value of the current is below the threshold current Ith of the excitation LD.

Figure 32A:
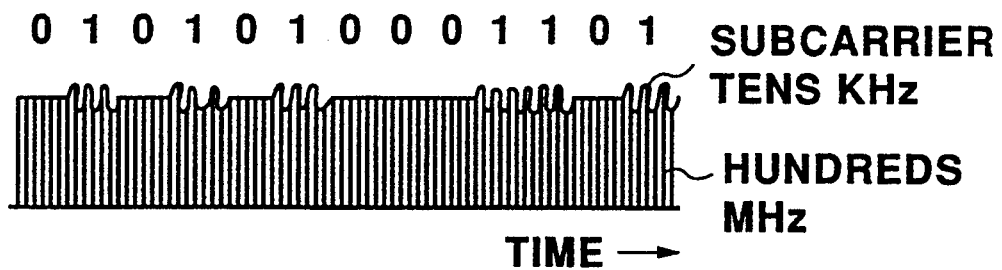
FIG. 32A is a diagram showing output light of the excitation LD of the twelfth embodiment.

FIG. 32A is a diagram showing the output light of an excitation LD 305 of this embodiment in comparison with the output light of the conventional excitation LD. The output will be as shown in FIG. 31 as excited by the current expressed by equation (4), and the relation of the typical frequency will be as shown in FIG. 32A.

As mentioned above, since the excitation LD oscillates in various modes when the current flowing the excitation LD crosses the threshold, the average vertical mode spectrum will be in a multimode. Therefore the maximal value of intensity noise of the excitation LD is reduced so that the intensity noise of the light amplifier also will be reduced.

Figure 32B:
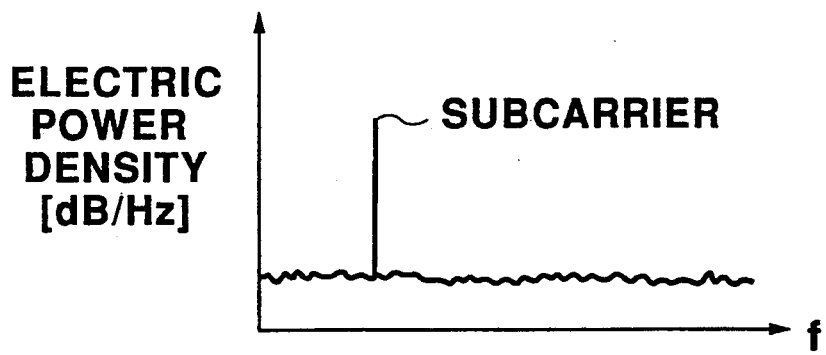
FIGS. 32B and 32C are graphs showing output light spectrums of the excitation LD of the twelfth embodiment.
Figure 32C:
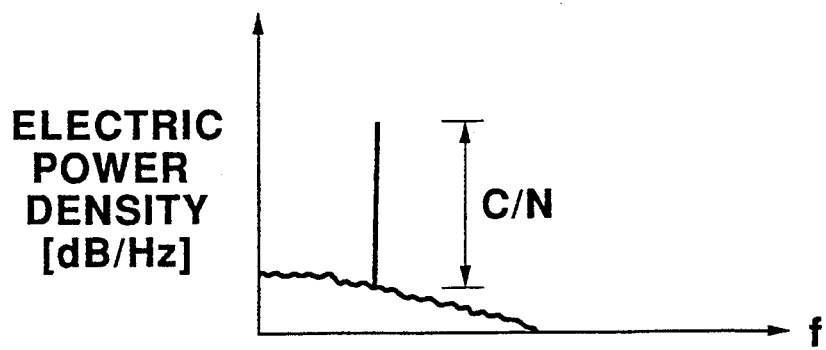

FIG. 32B shows a frequency spectrum of the output light of the excitation LD, from which it turns out that the low-frequency noise is lowered, compared to the corresponding spectrum of the conventional art. As a result, the spectrum of the output of the light amplification repeater will be as shown in FIG. 32C.

Figure 33:
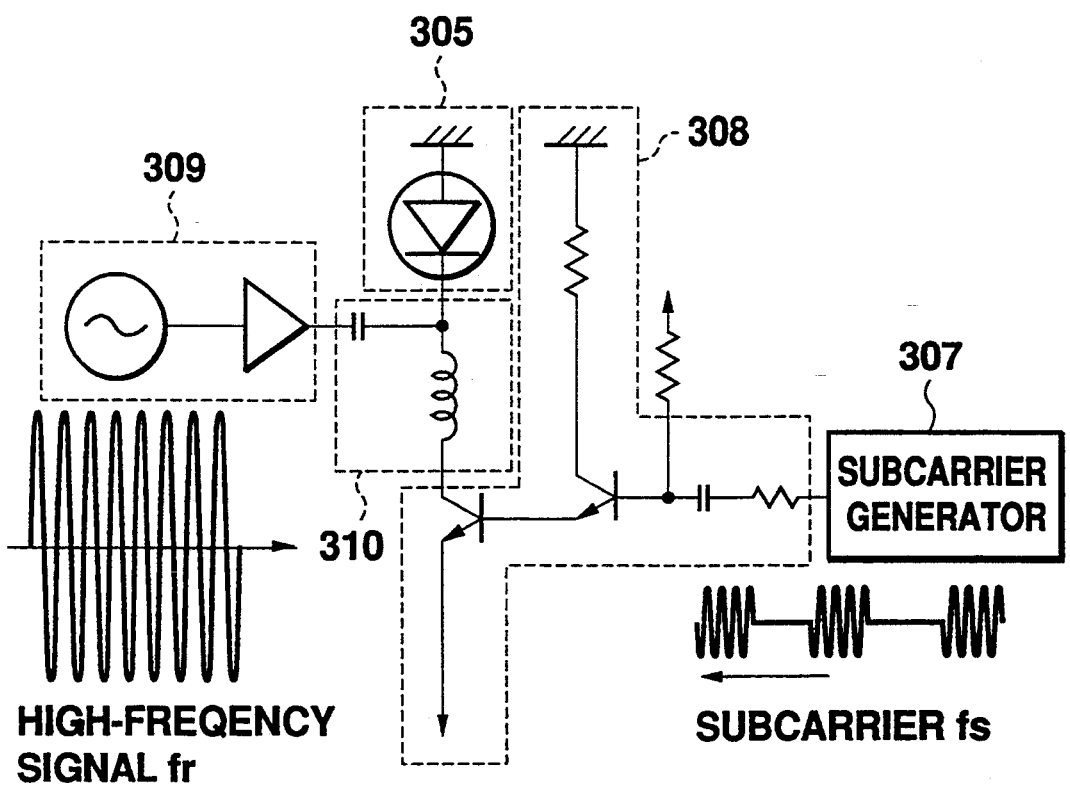

The excitation LD 305, the subcarrier generator 307, the excitation LD drive circuit 308, the high-frequency oscillator 309 and the adder 310, all shown in FIG. 30 may be in concrete forms as shown in FIG. 33. In the circuit of FIG. 33, the adder 310 has a T biasing, and the excitation LD drive circuit 308 is a current amplifier circuit with a Darlington transistor pair.

Figure 34:
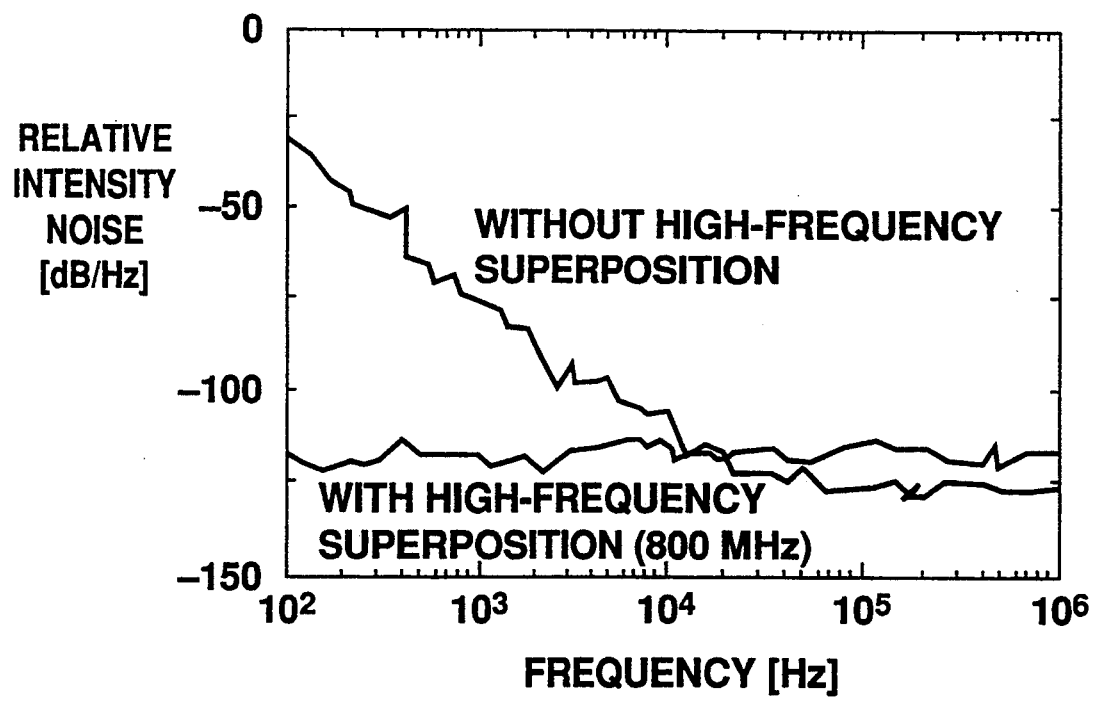
FIG. 34 is a graph showing the result of measurement of intensity noise according to the excitation LD of the twelfth embodiment.

FIG. 34 shows the results of measurement of relative intensity noise (RIN) of the excitation LD when a large-amplitude high-frequency modulation (superposition) takes place by a sine wave signal of 800 MHz. In the absence of high-frequency modulation (superposition), the relative intensity noise at 5 kHz is $-82$ dB/Hz, which is very poor. Whereas, by high-frequency superposition, it is possible to improve the relative intensity noise at low-frequency area, i.e. $-122$ dB/Hz at 5 kHz.

Figure 35:
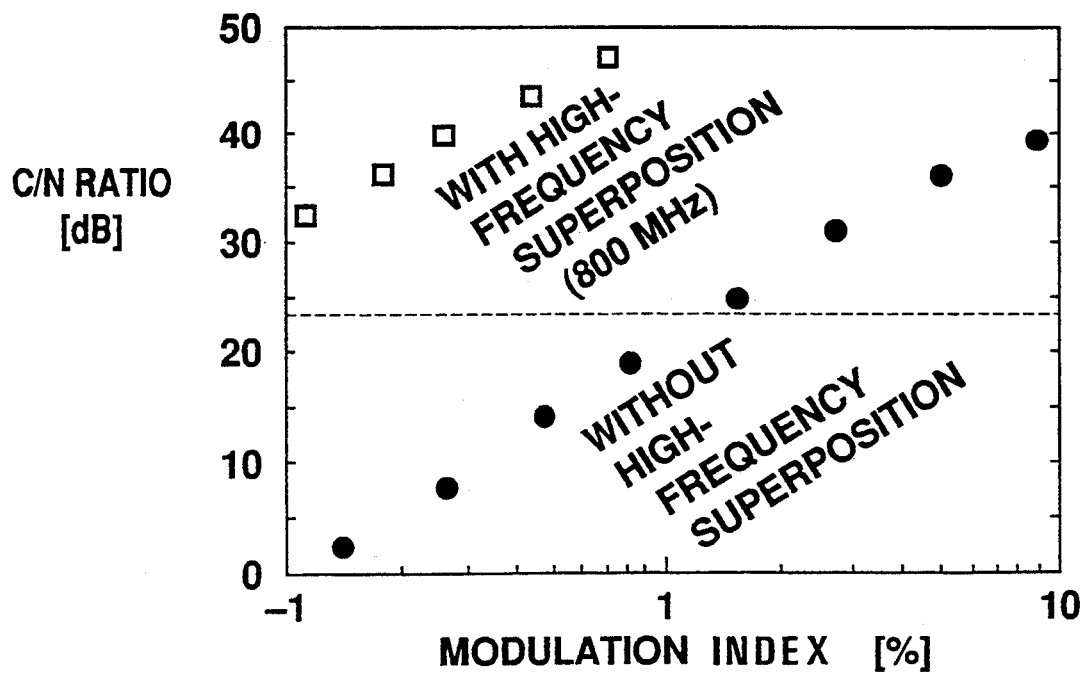
FIG. 35 is a graph showing the C/N ratio of subcarrier according to the excitation LD of the twelfth embodiment.

FIG. 35 shows the results of measurement of C/N ratio at that time. When the modulation degree was 1%, the C/N ratio was 20 dB; but high-frequency superposition improved to 50 dB, which is enough to secure transamission quality.

Figure 36:
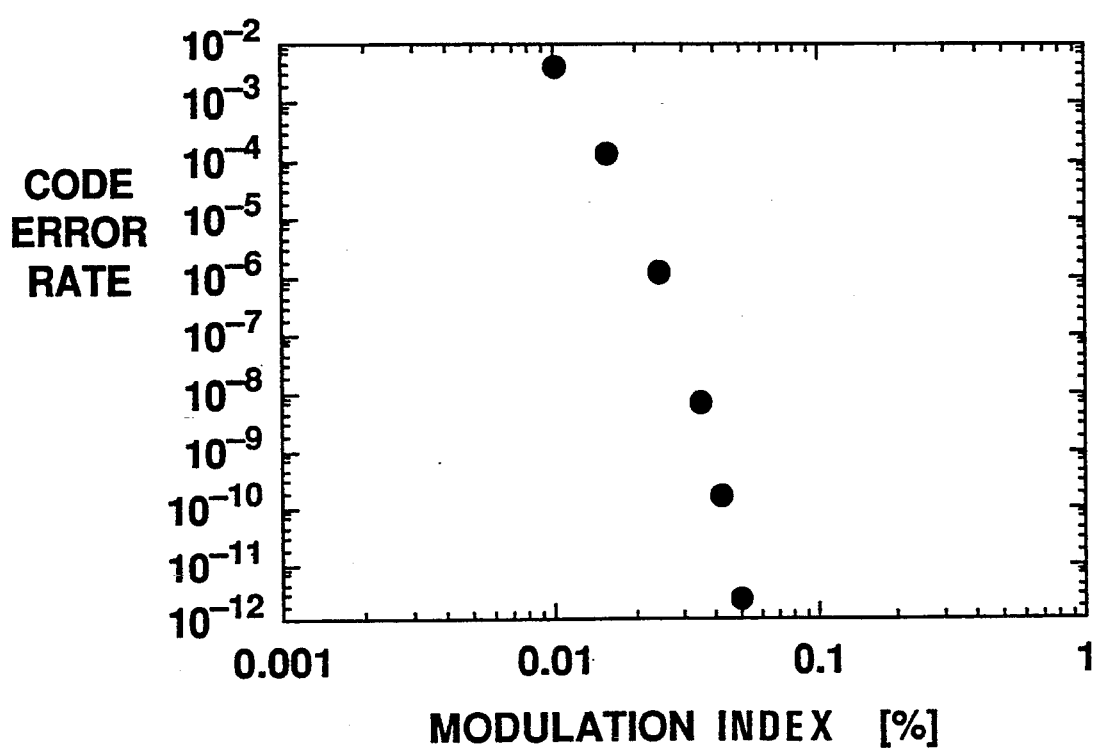
FIG. 36 is a graph showing the code error rate of subcarrier according to the excitation LD of the twelfth embodiment.

FIG. 36 shows the results of measurement of code error rate during high-frequency superposition. When the modulation degree of the subcarrier was 0.1%, an adequate code error rate of less than $10^{-12}$ was achieved.

Thus the usefulness of this invention was demonstrated.

In this embodiment, the signal to superpose was a sine wave signal. But the superposing signal may be a pulse signal with totally the same results. Since a pulse signal generator can be realized more easily than a sine wave generator, it is preferable to use a pulse signal from a view point of reducing the cost of production.

It is currently known to drive the excitation LD by pulses at a frequency of about 100 kHz. This embodiment utilizes a technical concept that is totally different from this known art. The pulse-driving is used to save electric energy consumption, the purpose for which the frequency of a pulse signal is preset to a low value. There was proposed no technical concept suggesting the amplitude of a pulse signal. Also no report was made on the concept that the pulse-driving retards noise. Whereas the object of this invention is to reduce noise of the light amplifier, the purpose for which the frequency of a superposing pulse (or sine wave) signal is preset to a high-frequency (usually over 600 MHz) near relaxation oscillation of the LD. What this invention calls for is that the minimal value of the amplitude of a pulse signal is below a threshold of the excitation LD. Further in this invention, it is possible to reduce noise of the light amplifier in the low-frequency area.

Figure 37:
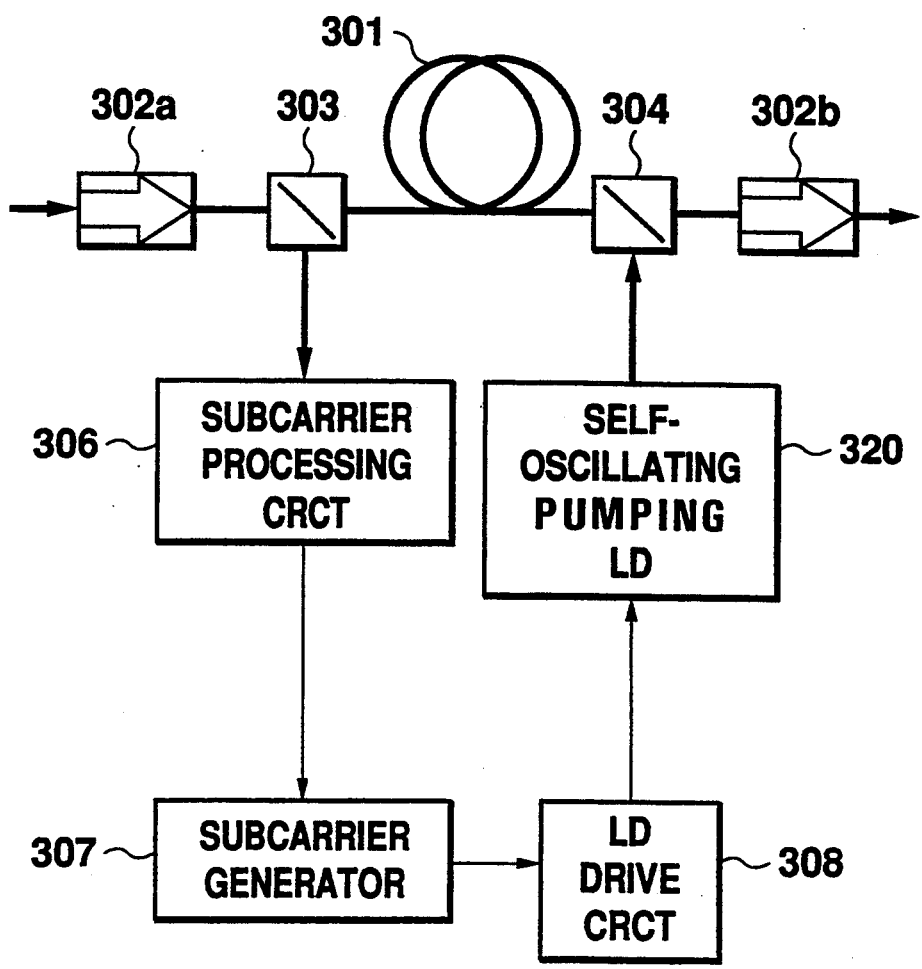
FIG. 37 is a diagram showing an excitation LD according to a thirteenth embodiment of the invention.

FIG. 37 shows a thirteen embodiment of this invention. Designated by 320 in FIG. 37 is a self-oscillating excitation LD, which is different from the conventional art. This self-oscillation phenomenon, in which the LD oscillates by itself at high-frequency in the absence of a signal, was discussed in, for example, "Factor Control and Noise Reduction of Self-Oscillation in VSIS Laser" by Hayashi et al., the collection of preparatory papers for the 31st Liaison Conference on Applied Physics, page 29 M4, 1984. Using a self-oscillating LD, it is possible to achieve the same results as those with high-frequency superposition at a frequency of several GHz, causing stable multimode oscillation. As a result, the output light of the self-oscillating excitation LD 320 will have the waveform of FIG. 32A according to a control signal from the excitation LD drive circuit 304 so that the intensity noise of the excitation LD is reduced to improve the transmission quality of the subcarrier. Since it does not require any high-frequency superposing circuit, simplification of the system can be realized.

Figure 38:
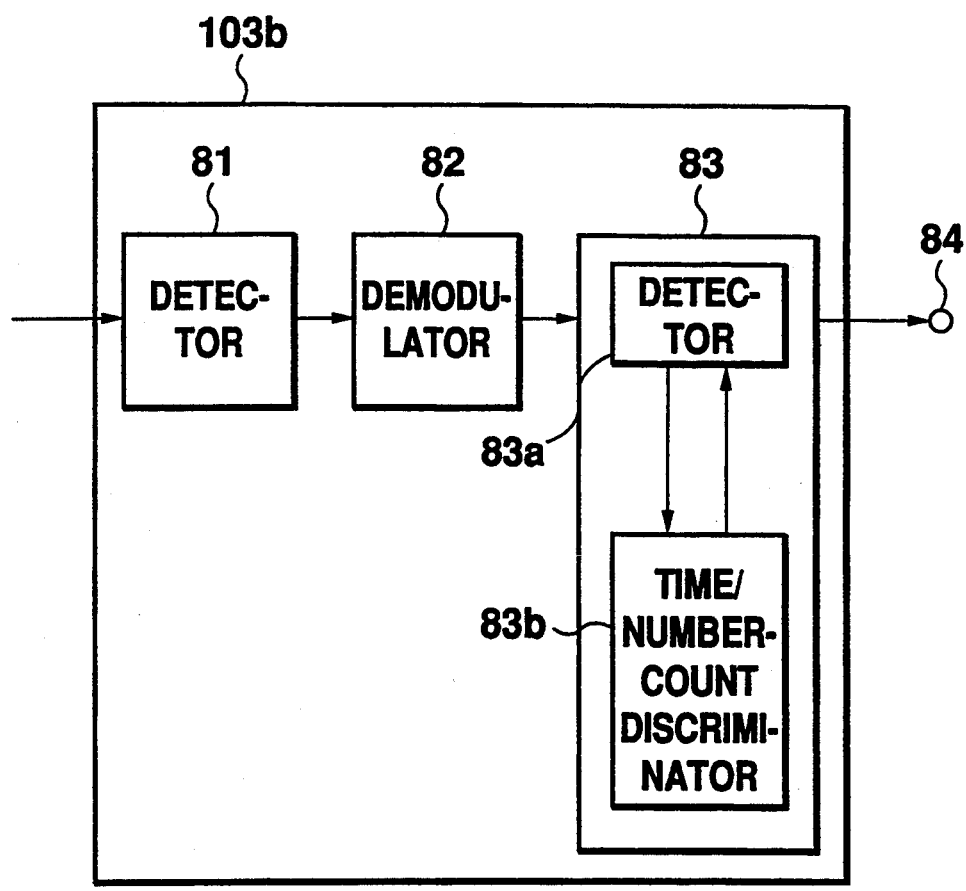
FIG. 38 is a circuit diagram showing the details of the excitation LD of the twelfth embodiment.

FIG. 38 shows a light end office 103b according to a fourteenth embodiment of this embodiment. The subcarrier converted into an electrical signal by a photoelectric converter 102b is synchronous-detected by a detector 81 and is then converted into binary information by a demodulator 82.

Figure 39:
FIG. 39 is a diagram showing a frame format of binary information according to the light end office of the fourteenth embodiment.
Figure 40:
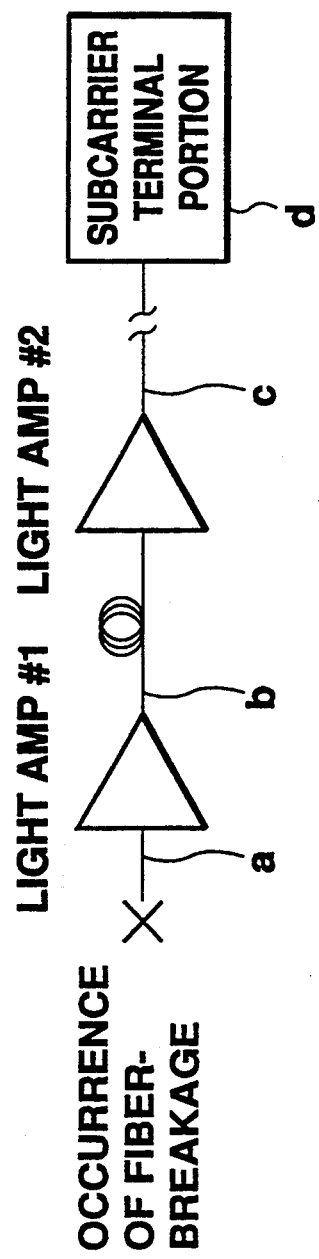
FIG. 40 is a system diagram of the light end office of the fourteenth embodiment.

A detector 83a of a decoder 83 detects carrier information bits to report to a discriminator 83b that an abnormal signal has been received. The discriminator 83b discriminates whether or not the number of subcarrier information bits continue for a predetermined period, or counts whether or not they continue for a predetermined number of successive frames or for a predetermined time period. FIG. 39 shows one example of frame format of binary information. 1 frame consists of 16 bits, every fourth bits of which are frame synchronizing bits. The subcarrier information bits are indicated by A and B in FIG. 39, and each bit will be "0" to indicate an abnormality for the fact "input is cut off". The decoder 83 judges the fact as "input is cut off" from this binary information to issue an alarm.

Figure 1:
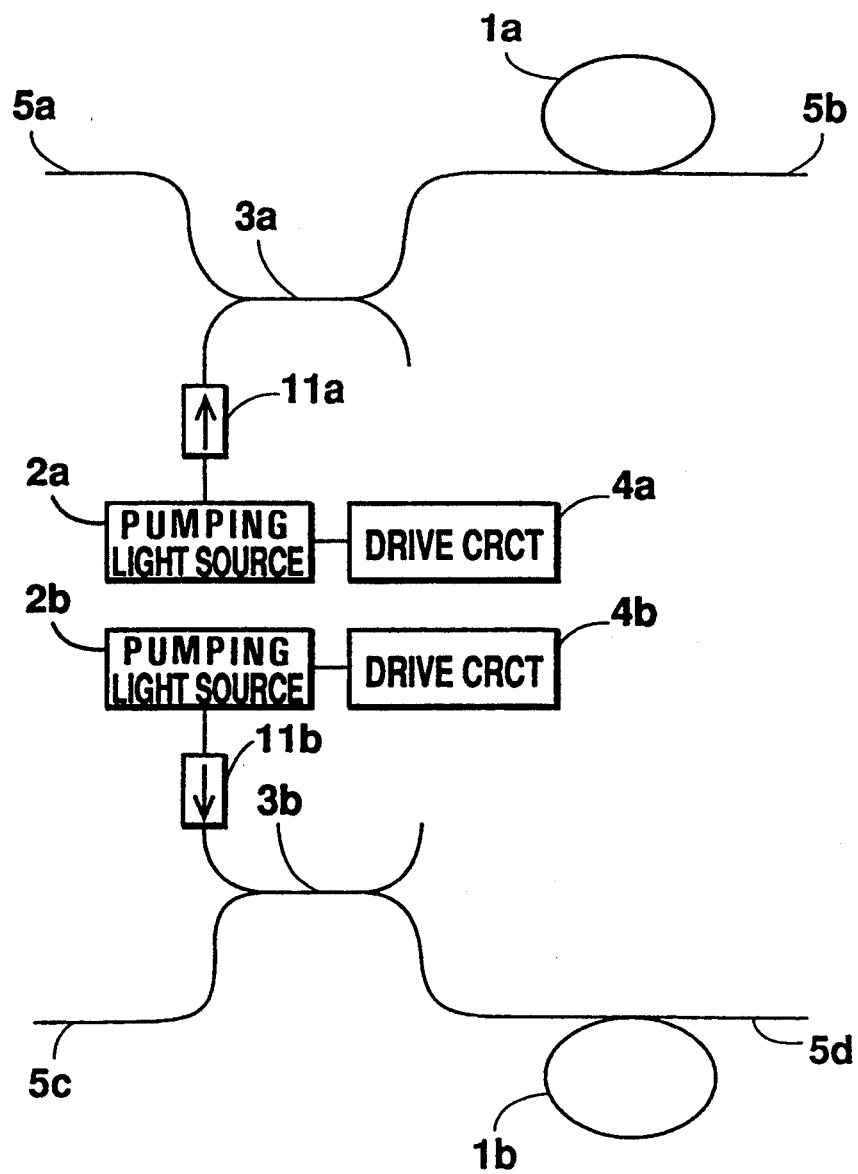
FIG. 1 is a diagram showing an optical-fiber light amplifier of the related art.
Figure 2:
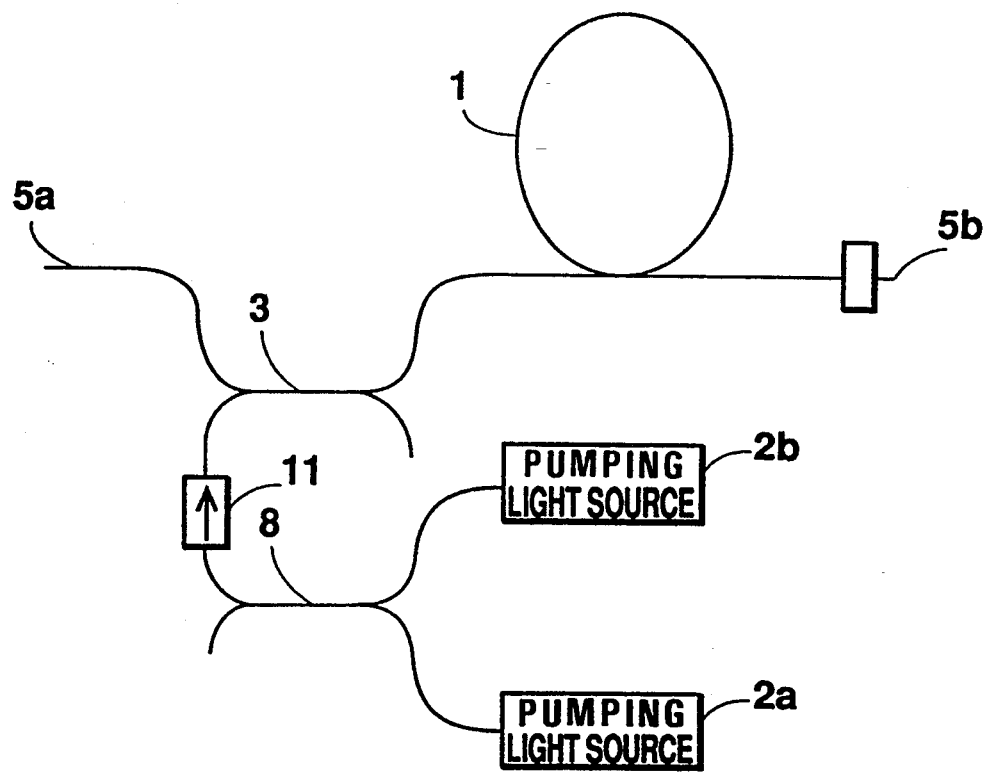
FIG. 2 is a diagram showing a first system of optical-fiber light amplifier of the related art.
Figure 3:
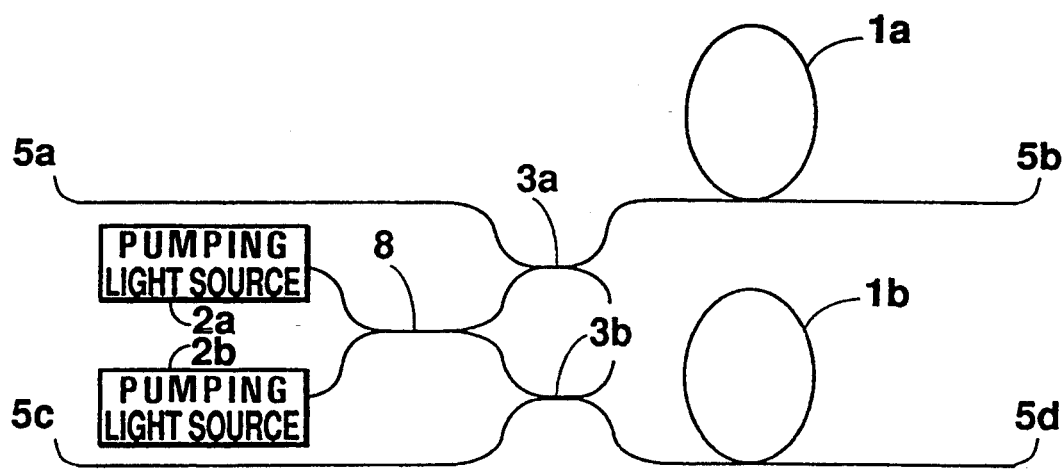
FIG. 3 is a diagram showing a second system of optical-fiber light amplifier of the related art.
Figure 4:
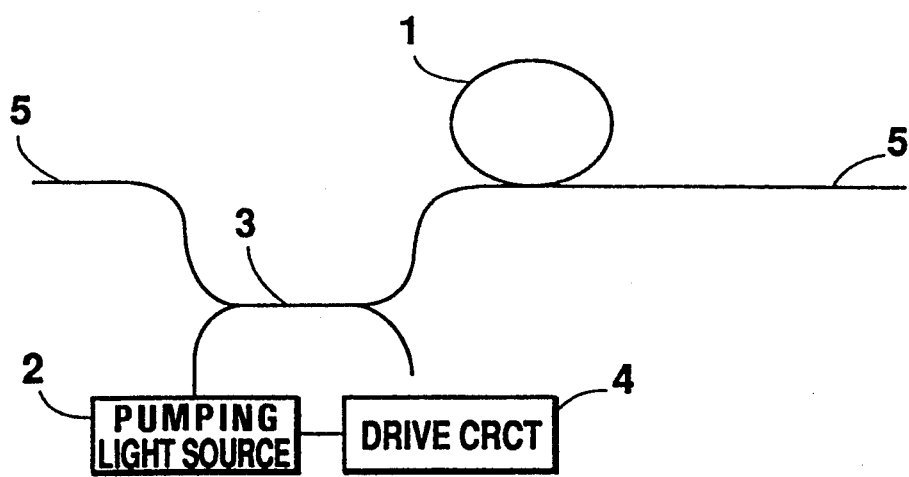
FIG. 4 is a diagram showing another optical-fiber light amplifier of the related art.
Figure 5:
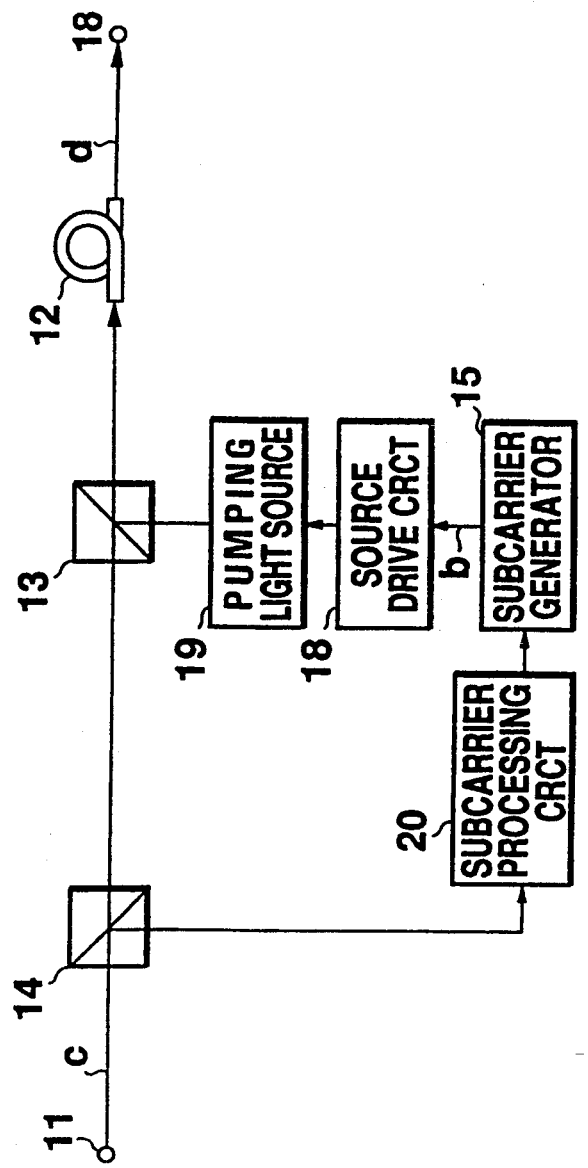
FIG. 5 is a light repeating system of the related art.
Figure 6:
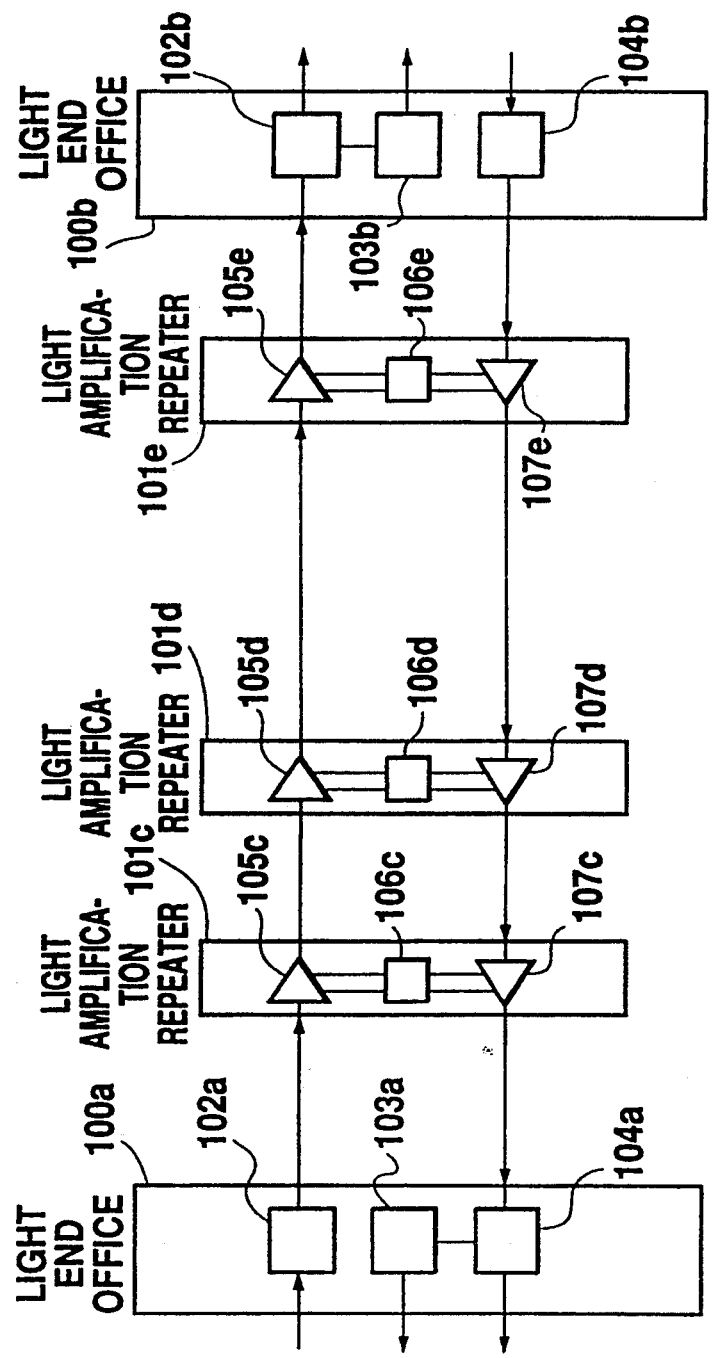
FIG. 6 is a block diagram showing a light amplification repeating and transmitting system of the related art.
Figure 7:
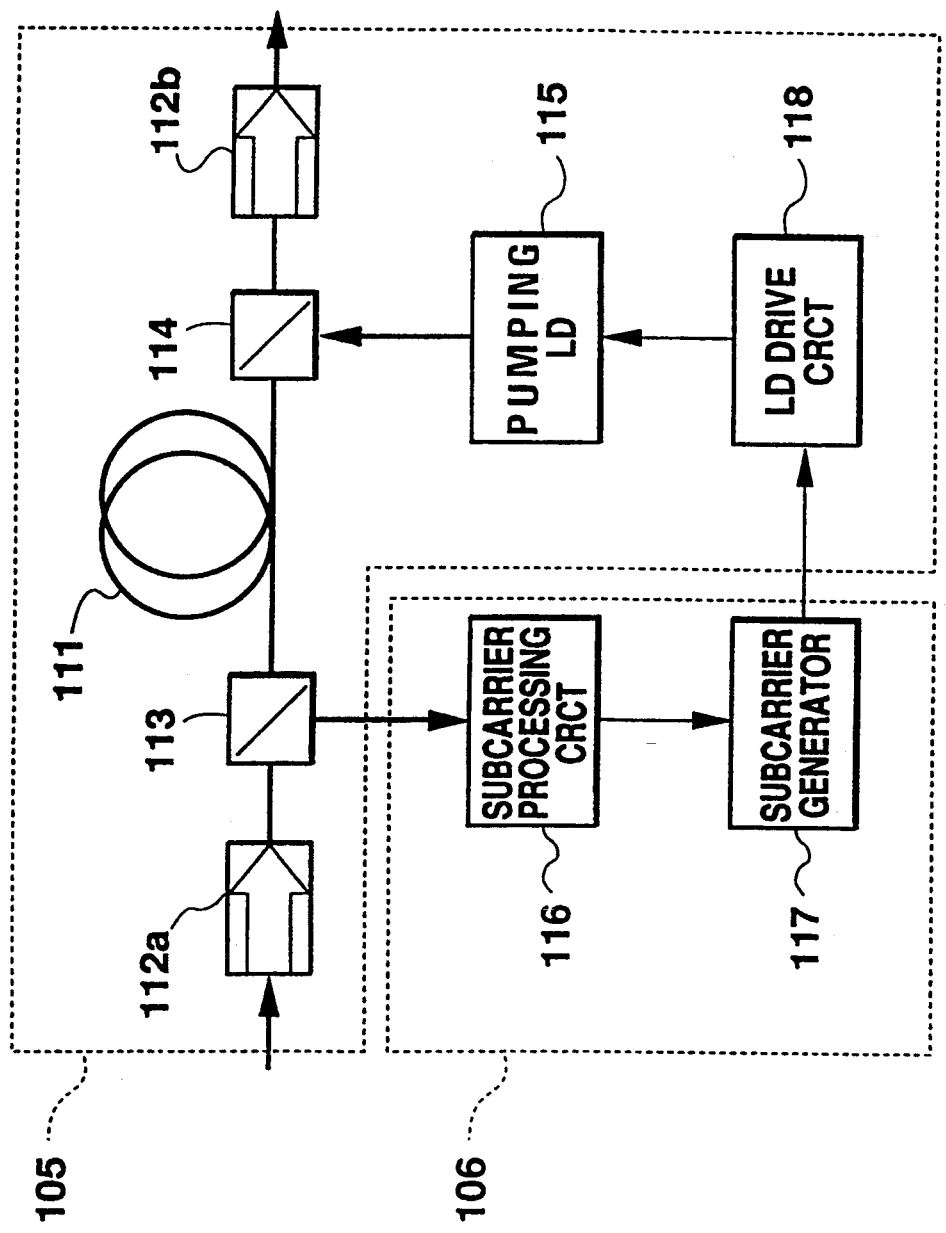
FIG. 7 is a block diagram showing a light amplification repeater of the related art.
Figure 8A:
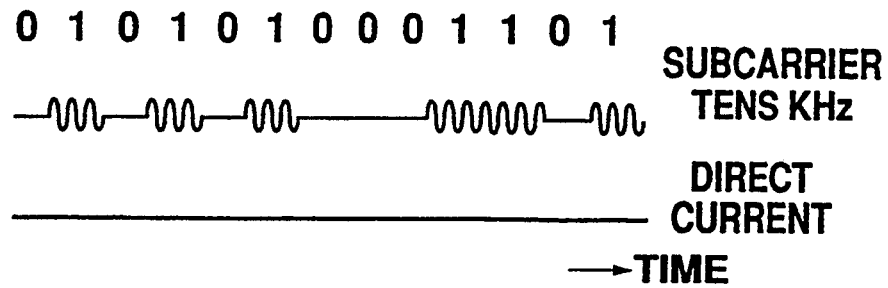
FIG. 8A is a diagram showing the output light of an excitation laser device (LD) of the related art.
Figure 8B:
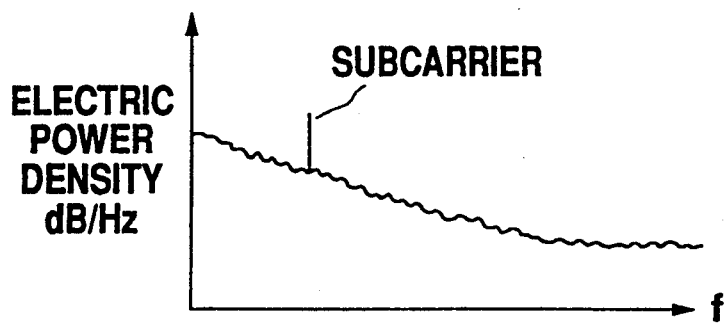
FIGS. 8B and 8C are graphs showing output light spectrums of excitation LD of the related art.
Figure 8C:
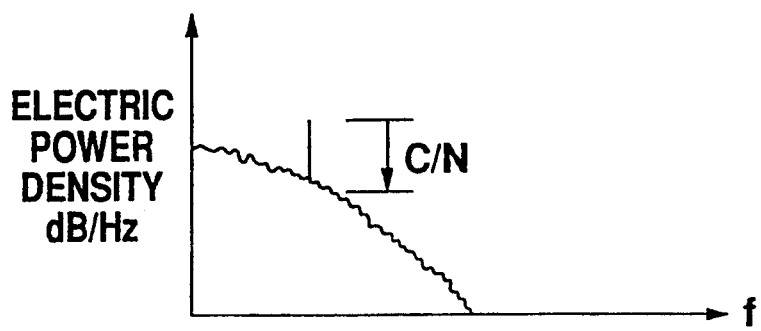
Figure 9:
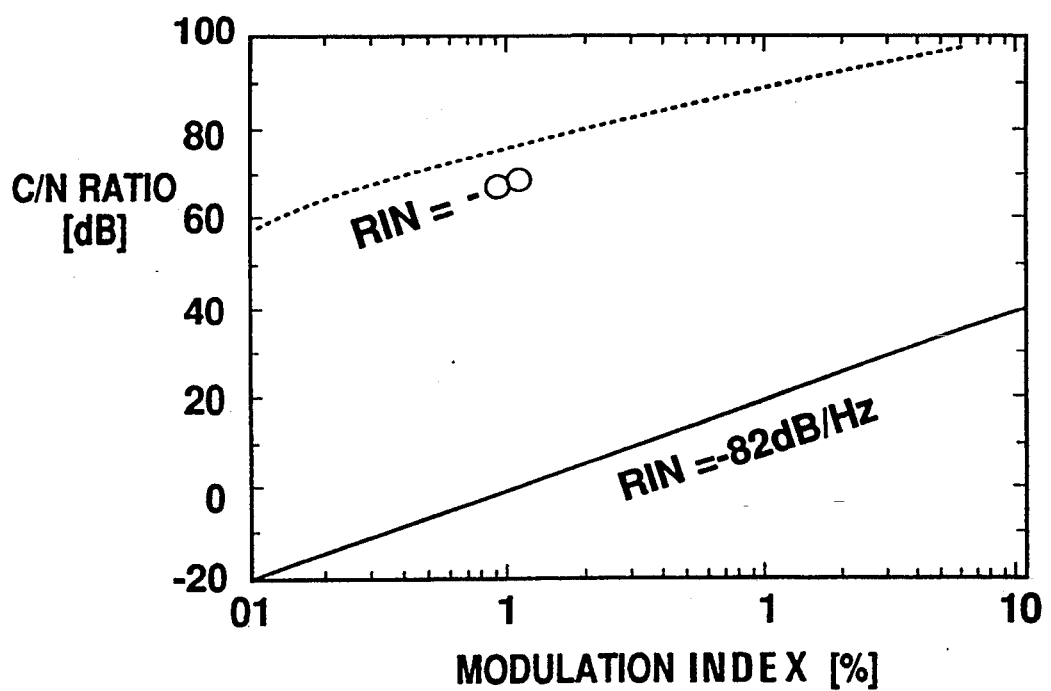
FIG. 9 is a diagram is a graph showing the C/N ratio of a subcarrier according to the related art.
Figure 41A:
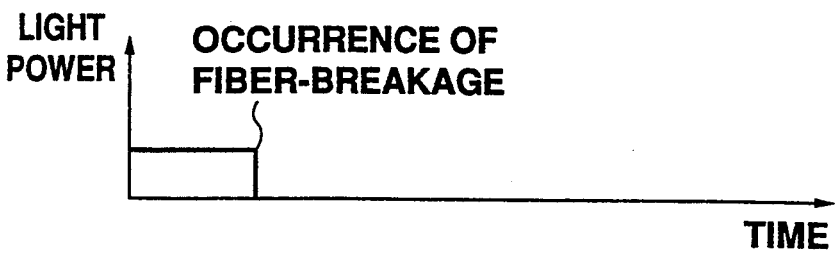
FIGS. 41A through 41E are timing diagrams of the light end office of the fourteenth embodiment.
Figure 41B:
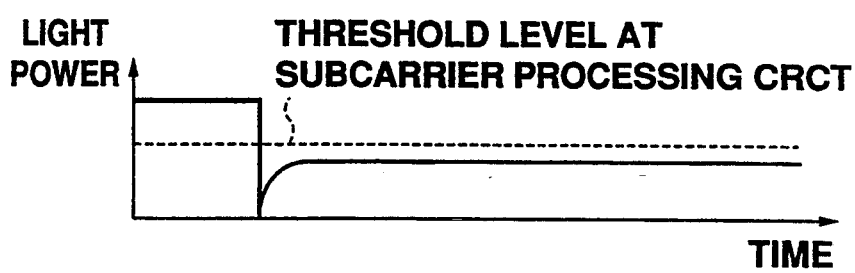

FIGS. 41A through 41E are timing diagrams of individual signals of various parts of the system when the fact "input is cut off" occurred. Assuming that the breakage of a fiber occurred at a particular time, the input light power of the light amplifier #1 (FIG. 4) varies as shown in FIG. 41A. The output power of the light amplifier #1 builds down instantly and then builds up slowly as natural emission light increases gradually, as shown in FIG. 41B. The time constant of the building-up is determined by a relaxation time constant of natural emission of the light amplifier. Having a threshold level preset between the output light power at the time of normal and the output light power at the time of "input is cut off", the light amplifier #1 detects the fact "input is cut off".

Figure 41C:
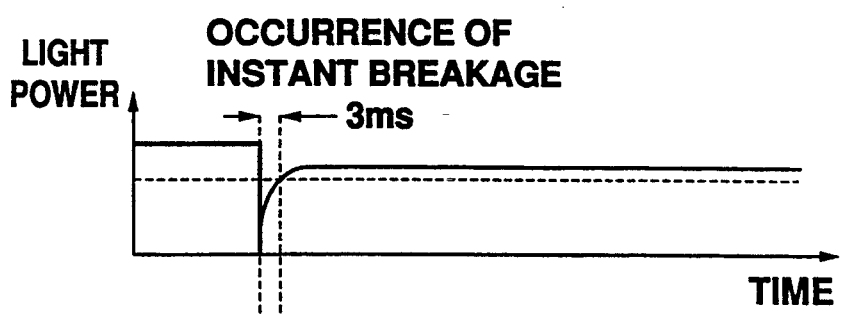

The output light power of the next-stage light amplifier #2 of FIG. 41C varies very similarly to that of FIG. 41B. In this case, since the natural emission light generated from the light amplifier #1 is inputted, the output of the light amplifier #2 will become much larger than the output of the light amplifier #1, exceeding the threshold.

Figure 41D:
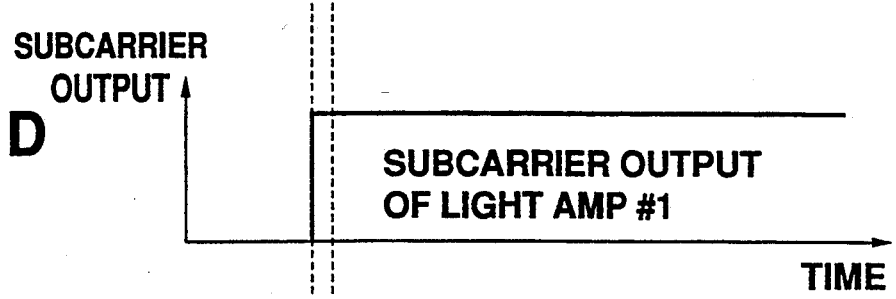
Figure 41E:
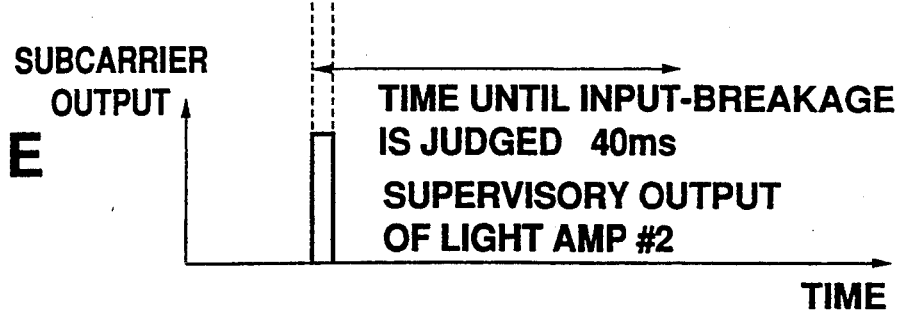

The subcarrier transferred from the light amplifier #1 and decoded at its terminal portion will become "HI" when it is below the threshold level, as shown in FIG. 41D. The subcarrier transferred from the light amplifier #2 and decoded will produce "HI" and will then return to "LO" when it restores over the threshold, as shown in FIG. 41E. According to the measurement, this time period was about 3 ms.

In the conventional art, since the fact "input is cut off" will be regarded as having occurred from both the light amplifiers #1 and #2, it is impossible to judge as to which is correct. Whereas in this invention, the discriminator 83b of the decoder 83 will not issue an alarm until the subcarrier information bit A will become, for example, "0" three consecutive times; this is, the result of judgment will not be issued in the absence of three consecutive coincidences. If the transmission rate of binary information is 1200 bits/s, it will take the time of 16×3 bits, i.e. 40 ms, until an alarm is issued. Even when an error subcarrier has arrived from the light amplifier #2 for a period of about 3 ms, the decoder does not judge it as error. It is therefore possible to judge the light amplifier #1 correctly as having issued "input is cut off".

In this embodiment, the subcarriers are digital. Alternatively analog subcarriers may be used.

In the case of analog subcarriers, a circuit-breakage-detecting-signal separator for analog signal separates a circuit-breakage signal in response to the sampling of subcarrier information bits at the decoder of FIG. 38. Unlike the case of digital subcarriers, only when the separated analog circuit-breakage signal has continued for a predetermined time period, it will be judged that there has occurred a fault.

As described above, according to this invention, since the system includes the excitation signal driving and adding means for modulating a bias signal, whose intensity is modulated by a subcarrier, with a high-frequency sine wave or pulse, and the excitation light generating means for generating excitation light to be excited to be by the output of the excitation signal driving and adding means, or since the system includes the excitation signal driving means for generating a bias signal whose intensity is modulated by a subcarrier, and the self-oscillating excitation light generating means for generating excitation light to be modulated by the output of the excitation signal driving means, it is possible to reduce noise contained in the carrier signal and also to reduce intensity noise of the light amplification repeater.

Further in the light end office, since the decoder for decoding a subcarrier from each light amplification repeater includes the discriminating means for detecting a plurality of successive codes from information bits of the subcarriers from the individual amplification repeaters to judge it as back error, it is possible to detect an abnormal with improved accuracy.

What is claimed is:

1. An optical amplifier comprising:
   (a) first and second sources for emitting first pumping light and second pumping light, respectively;
   (b) means for polarizing said first pumping light and said second pumping light in such a state that they are perpendicular to each other;
   (c) combining means for combining said first pumping light and second pumping light, which are emitted from said polarizing means, to form combined light;
   (d) distributing means, having first and second output terminals, for distributing said combined light from said combining means to said first and second output terminals; and
   (e) first and second amplifying media connected to said first and second output terminals, respectively.

2. An optical amplifier according to claim 1, wherein said first and second amplifying media are rare-earth-doped optical fibers.

3. An optical amplifier according to claim 1, wherein each of said combining means and said distributing means is an optical coupler.

4. An optical amplifier according to claim 1, wherein said combining means and said distributing means are a light polarization beam splitter and an optical coupler, respectively.

5. An optical amplifier according to claim 1;
   wherein said polarizing means is capable of polarizing a polarization surface of said first pumping light by +45 degrees to a predetermined axis, and said polarizing means is capable of polarizing a polarization surface of said second pumping light by −45 degrees to said predetermined axis; and
   wherein said combining means and said distributing means are capable of combining part of said first pumping light and part of said second pumping light, which are emitted from said polarizing means, to form combined light, and distributing such combined light to both said first and second output terminals.

6. An optical amplifier comprising:
   (a) a first source for emitting first pumping light;
   (b) a second source for emitting second pumping light having a wavelength different from those of said first pumping light;
   (c) means for combining said first pumping light and said second pumping light to form combined light;
   (d) means for distributing said combined light to both first and second output terminals; and (e) first and second amplifying media connected to said first and second output terminals, respectively.

7. An optical amplifier according to claim 6, wherein said first and second amplifying media are rare-earth-doped optical fibers.

8. An optical amplifier according to claim 6, wherein each of said combining means and said distributing means is a multiwavelength optical coupler.

9. An optical amplifier comprising:
(a) first and second sources for emitting first pumping light and second pumping light, respectively;
(b) means for combining said first pumping light and said second pumping light to form combined light;
(c) distributing means, having first and second output terminals, for distributing said combined light to both first and second output terminals; and
(d) an amplifying medium coupled to both said first and second output terminals for receiving said combined light.

10. An optical amplifier according to claim 9, wherein said amplifying medium is an rare-earth-doped optical fiber.

11. An optical amplifier according to claim 9, wherein each of said combining means and said distributing means is a multiwavelength optical coupler.

12. An optical amplifier comprising:
(a) light-amplifying means for amplifying a light signal; and
(b) polarization-limiting means, connected in series with said light-amplifying means, for reducing spontaneous emission light from said light-amplifying means.

13. An optical amplifier according to claim 12, wherein said light-amplifying means includes an rare-earth-doped optical fiber.

14. An optical amplifier according to claim 12, wherein said polarization-limiting means is a polarizer.

15. An optical amplifier according to claim 12, further comprising:
means for dividing part of the output light from said polarization-limiting means;
light-detecting means connected to one output terminal of said dividing means; and
means for controlling said polarization-limiting means based on the output of said light-detecting means.

16. An optical fiber amplifier comprising:
a first source for emitting first pumping light;
a second source for emitting second pumping light;
first polarizing means for polarizing said first pumping light to form first polarized pumping light;
second polarizing means for polarizing said second pumping light in a direction perpendicular to said first polarized pumping light to form second polarized pumping light;
combining means for combining said first polarized pumping light and second polarized pumping light to form combined light;
a first rare-earth-doped optical fiber;
a second rare-earth-doped optical fiber; and
distributing means for distributing said combined light to said first optical fiber and said second optical fiber.

17. An optical fiber amplifier according to claim 16, wherein each of said combining means and said distributing means is an optical coupler.

18. An optical fiber amplifier according to claim 16, wherein said combining means is an optical coupler, and said distributing means is a light polarization beam splitter.

19. An optical fiber amplifier according to claim 16:
wherein said first polarizing means includes means for rotating a polarization surface of said first pumping light by +45 degrees with respect to a predetermined axis, and said second polarizing means includes means for rotating a polarization surface of said second pumping light by −45 degrees with respect to said predetermined axis; and
wherein said combining means includes means for combining part of said first polarized pumping light and part of said second polarized pumping light to form combined light; and
wherein said distributing means includes means for distributing said combined light to said first optical fiber and said second optical fiber.

20. An optical fiber amplifier comprising:
a first source for emitting first pumping light;
a second source for emitting second pumping light having a wavelength different from those of said first pumping light;
combining means for combining said first pumping light and said second pumping light to form combined light;
a first rare-earth-doped optical fiber;
a second rare-earth-doped optical fiber; and
distributing means for distributing said combined light to said first optical fiber and to said second optical fiber.

21. An optical fiber amplifier according to claim 20, wherein each of said combining means and said distributing means is a multiwavelength optical coupler.

22. An optical fiber amplifier comprising:
a first source for emitting first pumping light;
a second source for emitting second pumping light;
combining means for combining said first pumping light and said second pumping light to form combined light;
distributing means, having first output terminal and a second output terminal, for distributing said combined light to said first output terminal and said second output terminal; and
a rare-earth-doped optical fiber coupled to both said first output terminal and said second output terminal for receiving said combined light, said optical fiber having amplifying properties with a saturation characteristic;
wherein either one of said first pumping light and said second pumping light has sufficient power to drive said optical fiber into saturation.

23. An optical fiber amplifier according to claim 22, wherein each of said combining means and said distributing means is a multiwavelength optical coupler.

24. An optical fiber amplifier comprising:
light-amplifying rare-earth-doped optical fiber means for amplifying a light signal; and
polarization-limiting means, connected in series with said light-amplifying means, for reducing spontaneous emission light from said light-amplifying means.

25. An optical fiber amplifier according to claim 24, wherein said polarization-limiting means is a polarizer.

26. An optical fiber amplifier according to claim 24, further comprising:
means for dividing part of the output light from said polarization-limiting means;
light-detecting means connected to one output terminal of said dividing means; and
means for controlling said polarization-limiting means based on an output of said light-detecting means.

* * * * *